US009846532B2

United States Patent
Herigstad et al.

(10) Patent No.: US 9,846,532 B2
(45) Date of Patent: Dec. 19, 2017

(54) METHOD AND APPARATUS FOR CONTROLLING VIDEO CONTENT ON A DISPLAY

(71) Applicant: SeeSpace Ltd., San Francisco, CA (US)

(72) Inventors: Dale Alan Herigstad, London (GB); Nam Hoai Do, San Francisco, CA (US); Nhan Minh Dang, Hanoi (VN); Hieu Trung Tran, Hanoi (VN); Quang Sy Dinh, Hanoi (VN); Thang Viet Nguyen, Hanoi (VN); Long Hai Nguyen, Hanoi (VN); Linh Chi Nguyen, Hanoi (VN)

(73) Assignee: SEESPACE LTD., San Francisco, CA (US)

( * ) Notice: Subject to any disclaimer, the term of this patent is extended or adjusted under 35 U.S.C. 154(b) by 402 days.

(21) Appl. No.: 14/704,905

(22) Filed: May 5, 2015

(65) Prior Publication Data
US 2015/0309687 A1    Oct. 29, 2015

Related U.S. Application Data

(63) Continuation-in-part of application No. 14/020,668, filed on Sep. 6, 2013.

(51) Int. Cl.
*G06F 3/00*    (2006.01)
*G06F 3/0485*    (2013.01)
(Continued)

(52) U.S. Cl.
CPC ........ *G06F 3/0485* (2013.01); *G06F 3/04883* (2013.01); *H04N 5/44591* (2013.01);
(Continued)

(58) Field of Classification Search
None
See application file for complete search history.

(56) References Cited

U.S. PATENT DOCUMENTS

| 6,573,905 B1 | 6/2003 | MacInnis et al. |
| 7,665,036 B1 * | 2/2010 | Lin ...................... G06F 3/0481 |
| | | 715/201 |

(Continued)

FOREIGN PATENT DOCUMENTS

| EP | 0156116 A2 | 10/1985 |
| EP | 2278801 A2 | 1/2011 |
| EP | 2538683 A2 | 12/2012 |

OTHER PUBLICATIONS

Extended European Search Report issued by the European Patent Office dated Mar. 27, 2017 in related European Patent Application No. 14842194.4, 8 pages.

(Continued)

*Primary Examiner* — Toan Vu
(74) *Attorney, Agent, or Firm* — Wilmer Cutler Pickering Hale and Dorr LLP

(57) ABSTRACT

A controller for controlling a display device that displays secondary digital content displayed in an overlay above a primary video stream. The controller includes a touch interface device, a processor, and a memory storing non-transitory instructions. These instructions, when executed, can include (i) detecting a first input gesture by a user on the touch interface device, (ii) in response to detecting the first input gesture, selecting an application for display on the display screen, (iii) detecting a second input gesture by the user on the touch interface device, (iv) in response to detecting the second input gesture, scrolling through a currently-displayed layer of the selected application displayed on the display screen, (v) detecting a third input gesture by the user on the touch interface device, and (vi) in (Continued)

response to detecting the third input gesture, scrolling between layers of the selected application in a simulated Z-space.

12 Claims, 30 Drawing Sheets

(51) Int. Cl.
| | |
|---|---|
| G06F 3/0488 | (2013.01) |
| H04N 5/445 | (2011.01) |
| H04N 21/431 | (2011.01) |
| H04N 21/462 | (2011.01) |
| H04N 21/478 | (2011.01) |
| H04N 21/41 | (2011.01) |
| H04N 21/422 | (2011.01) |
| G06F 3/01 | (2006.01) |
| H04N 21/4788 | (2011.01) |
| H04N 21/81 | (2011.01) |

(52) U.S. Cl.
CPC ....... *H04N 21/4126* (2013.01); *H04N 21/422* (2013.01); *H04N 21/42224* (2013.01); *H04N 21/431* (2013.01); *H04N 21/4316* (2013.01); *H04N 21/4622* (2013.01); *H04N 21/478* (2013.01); *H04N 21/4788* (2013.01); *H04N 21/8126* (2013.01); *H04N 2005/44595* (2013.01)

(56) References Cited

U.S. PATENT DOCUMENTS

| | | | |
|---|---|---|---|
| 8,144,251 B2 | 3/2012 | Huston et al. | |
| 8,416,262 B2 | 4/2013 | Saunders | |
| 2004/0117819 A1 | 6/2004 | Yu | |
| 2005/0041147 A1 | 2/2005 | Kim et al. | |
| 2005/0137958 A1 | 6/2005 | Huber et al. | |
| 2009/0299817 A1 | 12/2009 | Fok et al. | |
| 2010/0229125 A1 | 9/2010 | Cha | |
| 2011/0141362 A1 | 6/2011 | Soundararajan | |
| 2011/0209104 A1* | 8/2011 | Hinckley | G06F 3/0416 |
| | | | 715/863 |
| 2011/0320978 A1 | 12/2011 | Horodezky et al. | |
| 2012/0159383 A1* | 6/2012 | Matthews | G06F 17/30899 |
| | | | 715/788 |
| 2012/0166980 A1* | 6/2012 | Yosef | G06F 17/00 |
| | | | 715/762 |
| 2012/0304092 A1* | 11/2012 | Jarrett | G06F 9/4443 |
| | | | 715/765 |
| 2012/0317476 A1 | 12/2012 | Goldman et al. | |
| 2013/0055083 A1 | 2/2013 | Fino | |
| 2013/0167173 A1 | 6/2013 | Davis et al. | |
| 2013/0235069 A1* | 9/2013 | Ubillos | G09G 5/026 |
| | | | 345/594 |
| 2013/0298069 A1* | 11/2013 | Petschnigg | G06F 3/0483 |
| | | | 715/776 |
| 2013/0300684 A1* | 11/2013 | Kim | G06F 3/0488 |
| | | | 345/173 |
| 2013/0307792 A1 | 11/2013 | Andres et al. | |
| 2013/0339840 A1 | 12/2013 | Jain et al. | |
| 2014/0089833 A1* | 3/2014 | Hwang | G06F 3/04817 |
| | | | 715/769 |
| 2014/0247197 A1 | 9/2014 | Margulis | |
| 2014/0333530 A1 | 11/2014 | Agnetta et al. | |
| 2015/0074735 A1 | 3/2015 | Herigstad et al. | |
| 2015/0095950 A1 | 4/2015 | Lee et al. | |
| 2015/0135049 A1* | 5/2015 | Murphy | G06F 17/2235 |
| | | | 715/205 |
| 2015/0205502 A1* | 7/2015 | Ubillos | G06F 3/0484 |
| | | | 715/835 |
| 2015/0261426 A1* | 9/2015 | Mianji | H04L 65/403 |
| | | | 715/211 |
| 2016/0071241 A1* | 3/2016 | Karunamuni | G06T 3/60 |
| | | | 345/156 |

OTHER PUBLICATIONS

International Search Report and Written Opinion issued by the U.S. Patent and Trademark Office as International Searching Authority for International Application No. PCT/US14/54119 dated Nov. 25, 2014 (7 pages).

International Search Report and Written Opinion issued by the U.S. Patent and Trademark Office as International Searching Authority for International Application No. PCT/US16/30655 dated Aug. 8, 2016 (11 pages).

* cited by examiner

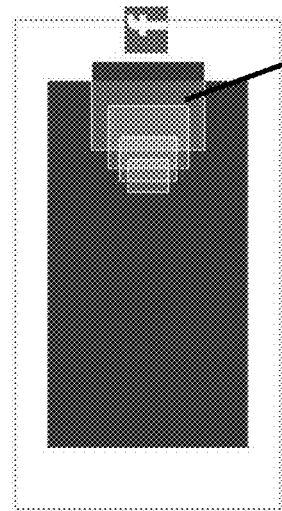
FIG. 12A
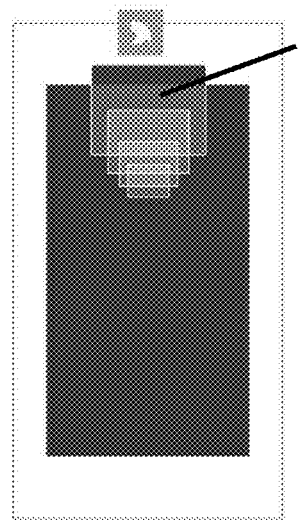
FIG. 12B
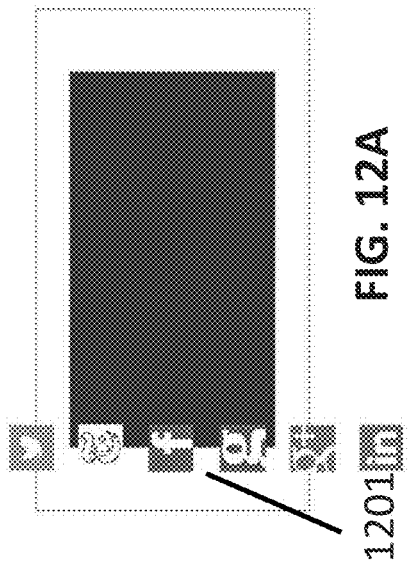
FIG. 12C
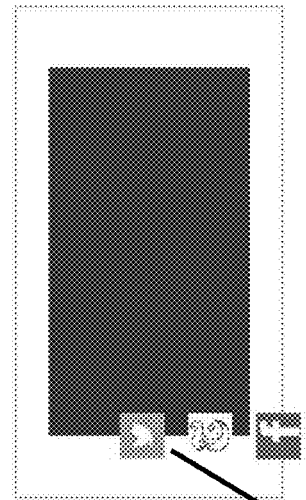
FIG. 12D
FIG. 12

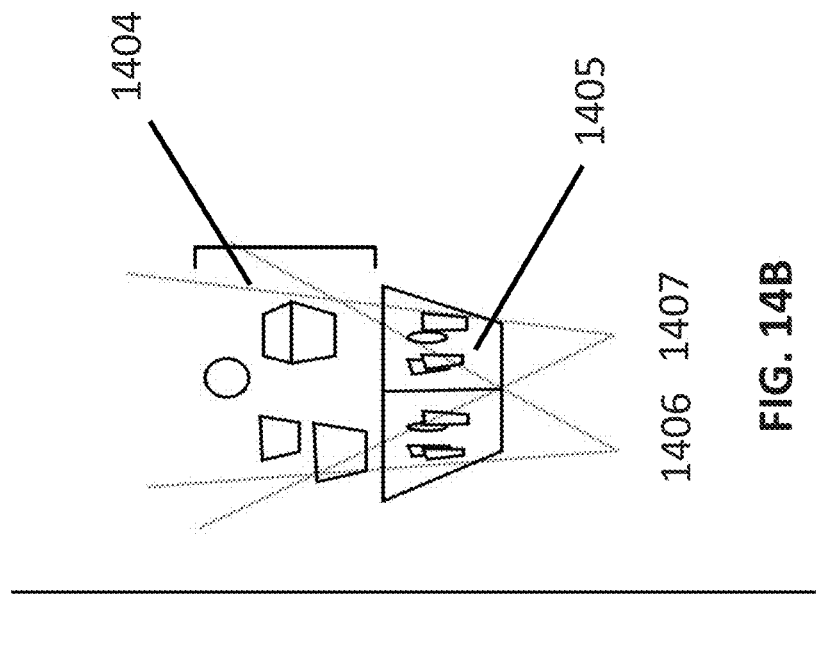
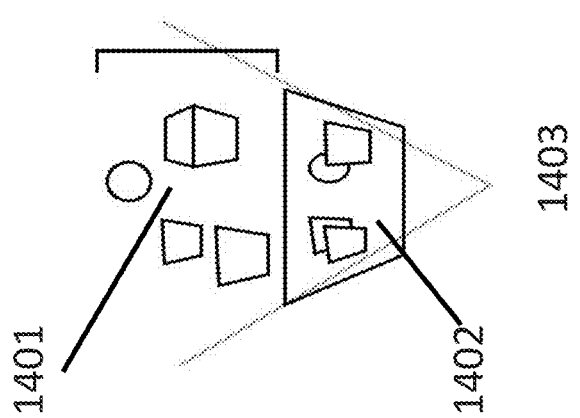

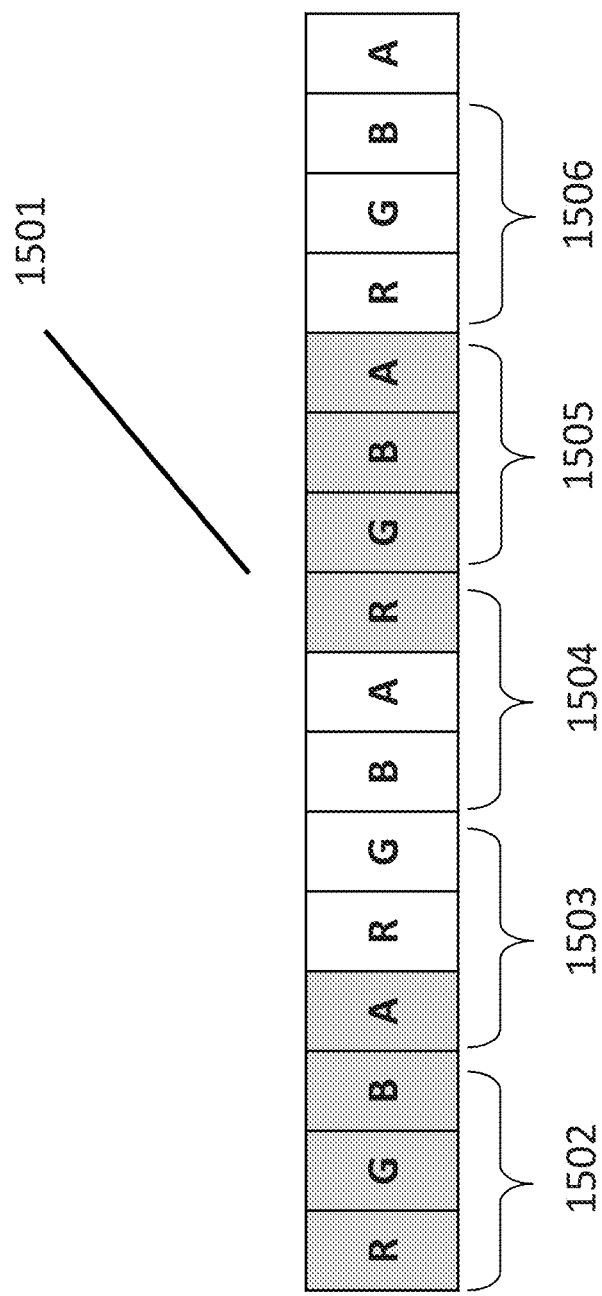

METHOD AND APPARATUS FOR CONTROLLING VIDEO CONTENT ON A DISPLAY

This application is a continuation-in-part of U.S. patent application Ser. No. 14/020,668, filed on Sep. 6, 2013, which is hereby incorporated by reference in its entirety.

FIELD OF THE INVENTION

This invention relates generally to the field of three-dimensional visualization, user interfaces, a controller for a display device, and digital content delivery.

BACKGROUND

The evolution of television entertainment has typically trailed the progress in other forms of media. The advent of the Internet and the advance of miniaturization of computers, however, have shifted how users have come to expect content to be consumed. As the Internet has grown in popularity and use around the world, it has grown into a viable source of video and information content. The miniaturization of computers, from the laptop computer, to the tablet computer and the smartphone, has created increased computing power in smaller and smaller form factors. Having grown accustomed to consuming Internet content everywhere and anywhere, users today often expect information access and interactivity even while simultaneously watching television at home. Hence, it is not uncommon today for audiences to use laptops or tablets to browse digital content related to the shows they are watching live on television. For example, viewers may want to view information about the actors starring in a movie or television show. In addition, viewers may want to post comments to social media during the viewing experience.

The ability to perform these tasks while watching television is often handled by devices other than the television, such as tablets, smartphones, and laptops, which may be referred to as a "second screen." However, the use of a "second screen" to perform these tasks often inhibits the viewers' ability to simultaneously follow the action on the television. By looking at their "second screen," i.e., their laptop screen, tablet, or smartphone, viewers take their attention away from the television and may miss an important dialogue, event or play. Accordingly, it is not uncommon for a viewer's experience to be impaired when attempting to view "secondary" Internet content away from the television.

There is a need to solve one or more of the problems set forth above.

SUMMARY OF INVENTION

There is a need for a controller for secondary digital content on a display screen. In addition, there is a need for a method and system that unifies the ability to view digital content without requiring the user to take their attention away from the television. In addition, there is a need for a method and system to provide a simplified interface to interact with the digital content without distracting from the primary video content on the television. Finally, if the television itself is the conduit for digital content, there is a need for a method and system to display both video content and related digital content in a way that is appealing, simple, and elegant. Embodiments of the present invention make possible the integration of secondary digital content and primary video content within a single viewing experience.

One embodiment of the invention is a controller for controlling a display device. The controller includes a touchscreen including a sensor to capture gestures from the user, a non-transitory computer readable medium, a processor operatively coupled to the computer readable medium, and an application storing instructions in the computer readable medium. The instructions are executable by the processor to (i) cause the touchscreen to display an input/output interface on the touchscreen that has no custom buttons or keys for input from the user, (ii) process the captured gestures from the user, and (iii) wirelessly control content displayed on the display device.

According to another embodiment of the invention, a device for rendering video content includes a reception module for receiving secondary digital content over the Internet, a decoding module for decoding a primary video stream received through the reception module, a rendering module including logic to render secondary digital content in an overlay above the primary video stream by using the secondary digital content received through the reception module, and an encoding module including logic to encode a digital video content stream that has been rendered by the rendering module into a three-dimensional video format. The overlay may be encoded as a three-dimensional layer above the primary video stream.

Another embodiment of the invention is a method for combining multimedia content comprising receiving primary video content from a video content provider, processing the primary video content including rendering secondary digital content in a transparent layer that overlays the primary video content to form combined video content, and transmitting the combined video content to a video display device. The combined video content may include an aggregation of the primary video content and the secondary digital content.

Another embodiment of the invention is a device for rendering video content that includes a first reception module for receiving secondary digital content from the Internet, a second reception module for receiving a primary video stream, a decoding module for decoding the primary video stream received through the second reception module, a rendering module that contains logic to render digital video content in an overlay above the primary video stream by using the secondary digital content, an encoding module that contains logic to encode digital video content that has been rendered by the rendering module into a video format for display on an output screen, and a controller module that contains logic for decoding an input signal from a controller device to control a display of the transparent layer on the output screen. The encoding module may encode the overlay as a transparent layer above the primary video stream.

Another embodiment is a controller for controlling a display device that displays secondary digital content displayed in an overlay above a primary video stream. The controller includes a touch interface device, a processor, and a memory storing non-transitory instructions for controlling the processor to perform operations during execution. These operations can include (i) detecting a first input gesture by a user on the touch interface device, (ii) in response to detecting the first input gesture, selecting an application for display on the display screen from a set of two or more applications displayed on the display screen, wherein the two or more applications are the secondary digital content displayed in the overlay above the primary video stream on the display screen, (iii) detecting a second input gesture by the user on the touch interface device, (iv) in response to detecting the second input gesture, scrolling through a currently-displayed layer of the selected application displayed on the display screen, wherein scrolling through the currently-displayed layer takes place in an X-Y plane on the display screen, (v) detecting a third input gesture by the user on the touch interface device, and (vi) in response to detecting the third input gesture, scrolling between layers of the selected application in a simulated Z-space on the display device. In still other embodiments, the invention is a computer readable medium with instructions that, when executed, perform the steps set forth above.

BRIEF DESCRIPTION OF THE DRAWINGS

The invention is illustrated in the figures of the accompanying drawings which are meant to be exemplary and not limiting, in which like references are intended to refer to like or corresponding part, and in which:

FIG. 12A illustrates a first view of the use of secondary content "channels" in accordance with certain embodiments of the disclosed subject matter;

FIG. 12B illustrates a second view of the use of secondary content "channels" in accordance with certain embodiments of the disclosed subject matter;

FIG. 12C illustrates a third view of the use of secondary content "channels" in accordance with certain embodiments of the disclosed subject matter;

FIG. 12D illustrates a fourth view of the use of secondary content "channels" in accordance with certain embodiments of the disclosed subject matter;

FIG. 14A is a first block diagram that illustrates how computational vectors may be used to render a two-dimensional image and a three-dimensional image;

FIG. 14B is a second block diagram that illustrates how computational vectors may be used to render a two-dimensional image and a three-dimensional image;

FIG. 15 is a block diagram that illustrates how alpha-blended pixel data may be computationally expensive to transfer and process based on limited channel widths;

DETAILED DESCRIPTION

Given the demand to access digital content relating to (primary) video content airing on television, some embodiments of the invention provide a method and system of integrating the experience of accessing secondary digital content with onscreen primary video streaming content through the use of layers. Additionally, some embodiments of the invention provide a method and system to make this experience accessible, simplified, and integrated with the primary video content. Additionally, some embodiments of the invention provide a method and system to curate and distill the volume of information that is available for a particular primary video content.

Figure 1:
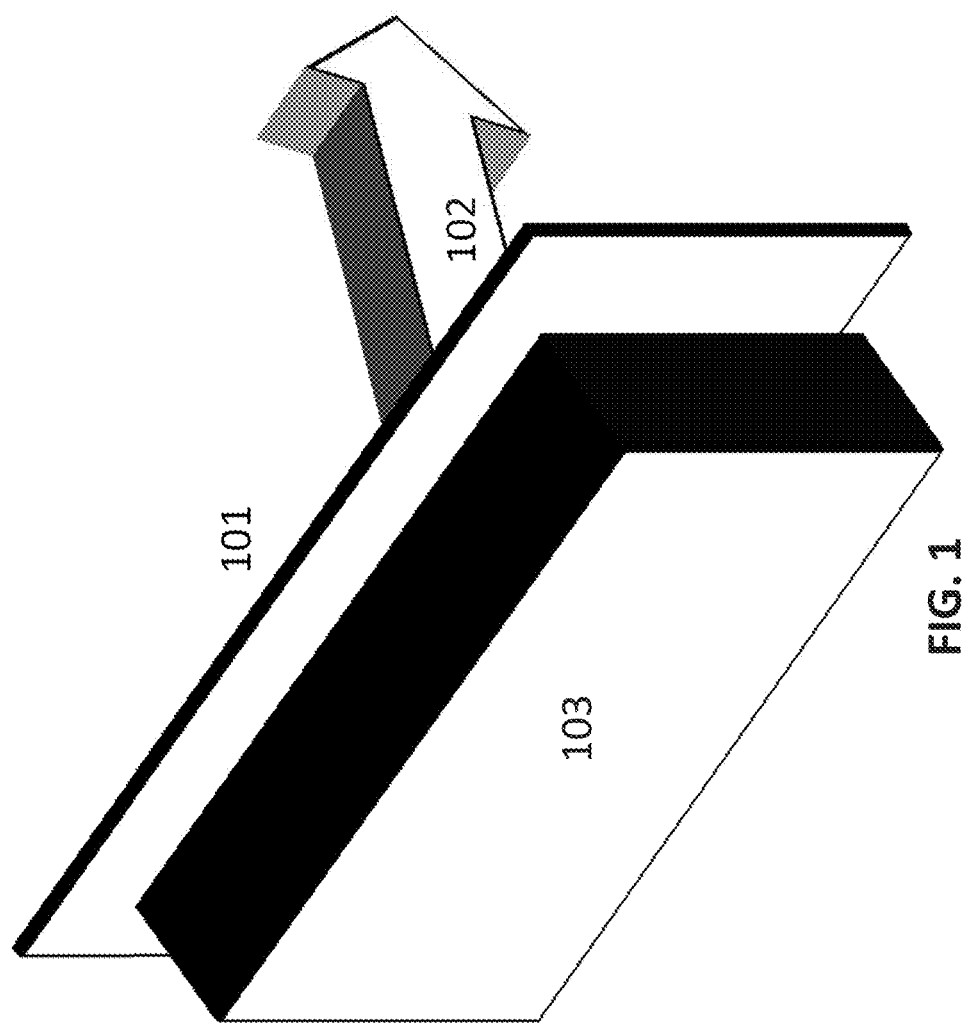
FIG. 1 is an illustration of the relationship between the primary video stream and the "interaction space"

Some embodiments of the invention provide a method and system where the television screen may act as a window into a live action scene with graphical overlays. As shown in FIG. 1, the screen 101 may serve as a "window into a live scene," with in-screen depth represented by the arrow 102. Using layers to overlay the primary video stream, additional content can appear in the space between the screen and the viewer, i.e., in the "interaction space" shown as layer 103 in FIG. 1. In other words, some embodiments of the invention broaden the scope of the experience and delivery of television to include the space between the screen and the viewer.

There are several ways to achieve the visual effect of placing content (i.e., graphics, text, video) in the "interaction space" between the screen and the viewer, including at least: (1) use of "second screen" mobile devices and (2) 3DTV graphics ("pushed out from the screen"). In some embodiments, the invention provides a method and system for using the 3DTV graphics, to utilize the "interaction space." This approach allows a viewer to avoid having to take his or her eyes away from the television screen to view a "second screen" device. 3DTV also has the advantage of feeling immersive without covering the video stream underneath.

Figure 2:
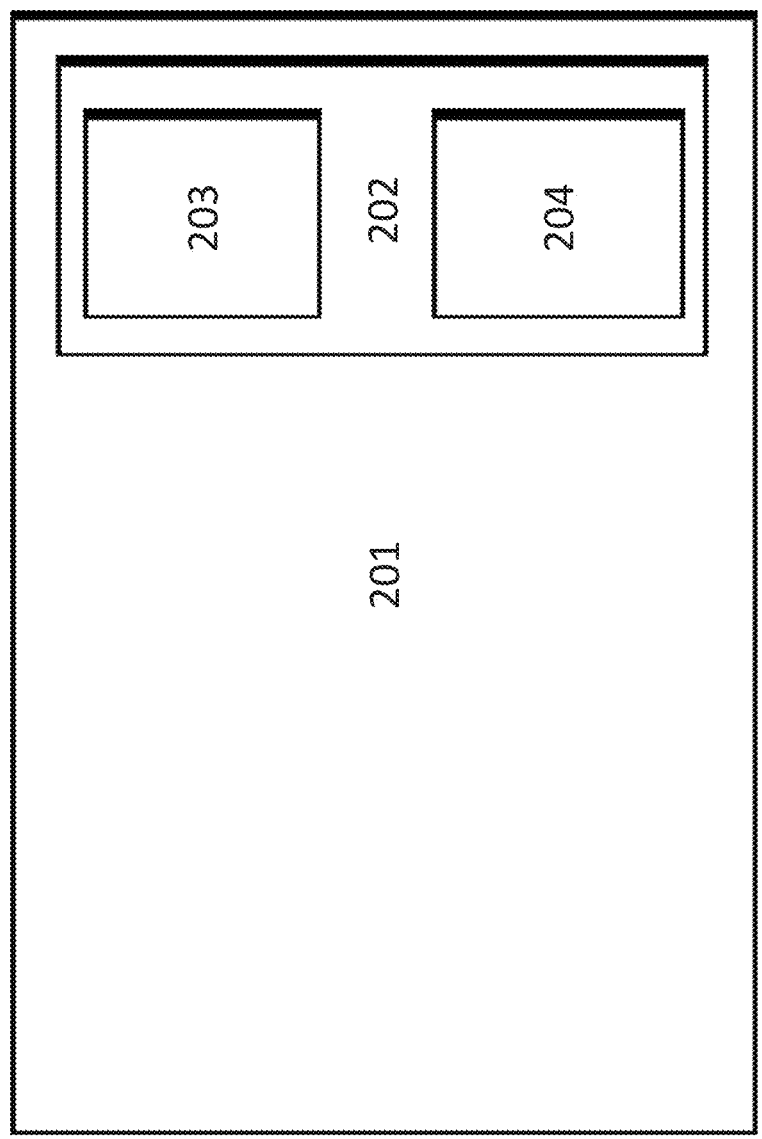
FIG. 2 is a block diagram illustrating layers overlaying a primary video stream.

For example, some embodiments of the invention provide a method and system for displaying sporting news, such as the scores of sporting contests, the standings of sports teams, and related statistics, on the screen while displaying a sporting invent. FIG. 2 is an example of how layers may be used to display secondary content, such as sporting news. In this example, the sporting event may be displayed on the center 201 of the screen. A layer 202 may be used to display (1) individual player statistics obtained from the Internet in location 203 and (2) other box scores in location 204. In some embodiments, layer 202 may be moved or translated around the screen based on the viewer's choice. In some embodiments, layer 202, including locations 203 and 204, can be in 3D; that is, it can be in the interaction space 103 shown in FIG. 1, with the primary video content (i.e., the sporting event in this example) displayed underneath it. In other embodiments, layer 202, including locations 203 and 204, can be displayed in two dimensions; that is, it can be displayed on top of the viewing area 201.

In some embodiments, the invention provides a method and system for viewing, for example, information about the movie currently onscreen from websites such as IMDB™ and RottenTomatoes™. In some embodiments, the invention provides a method and system for accessing and posting information on social media websites, such as Facebook™ and Twitter™. Hence, the invention creates the possibility of a three-dimensional IP content browser for the viewer that is displayed in the interaction space between the viewer and the screen. Beyond the living room, the invention has applications in areas other than television. For example, the invention may provide a method and system for accessing secondary content from the Internet while viewing a promotional video (primary video stream) at a retail location.

In some embodiments, the invention provides a method and system for interactive advertising and promotional content. In some embodiments, the invention provides a method and system for interacting with advertising content, such as content retrieved from a merchant or vendor's website, including images and descriptions of merchandise or services for sale. In some embodiments, the invention provides a method and system for viewing promotions, sales, or campaigns that are related to the content from the primary video stream, e.g. a television commercial, a commercially-sponsored sporting event, or product placement in a television show or feature film. As an example, if the primary video content on the television shows a purse made by a particular retailer, the system can recognize that the purse is shown on the screen and make available additional information about the purse. This information can include, for instance, advertisements for the purse. In addition, while viewing the advertisements as secondary overlay data or while viewing the primary data, selections can be available through the secondary overlay data to purchase the purse. In this way, the secondary content can display advertisements or purchasing information relating to the specific information that is displayed as the primary video data.

Selection of the appropriate secondary content for display may be determined by screening a number of different metadata sources, such as information from the electronic programming guide or closed captioning provided by the television station, cable company, satellite company, or Internet video provider. Additionally, the metadata content may be screened by ranking popular viewer searches and viewer activities contemporaneously to determine relevant secondary digital content.

Some embodiments of the invention provide a method and system for interacting with a multimedia video system using gestures and motions. Specifically, some embodiments of the invention provide a method and system for querying, searching, and accessing digital video content onscreen using gestures. In this way, viewers may access digital content relating to the primary video content on the screen from their seats without having to operate a complicated controller. This enhances the viewer's experience by removing any barriers between the viewer and the "interaction space." The use of basic, natural gestures in the three-dimensional space between the viewers and the television display, such as lifting, swiping, and grabbing, further builds the immersive sensation for the viewers that they are virtually "pushing," "pulling," and "grabbing" onscreen graphical elements.

Figure 3:
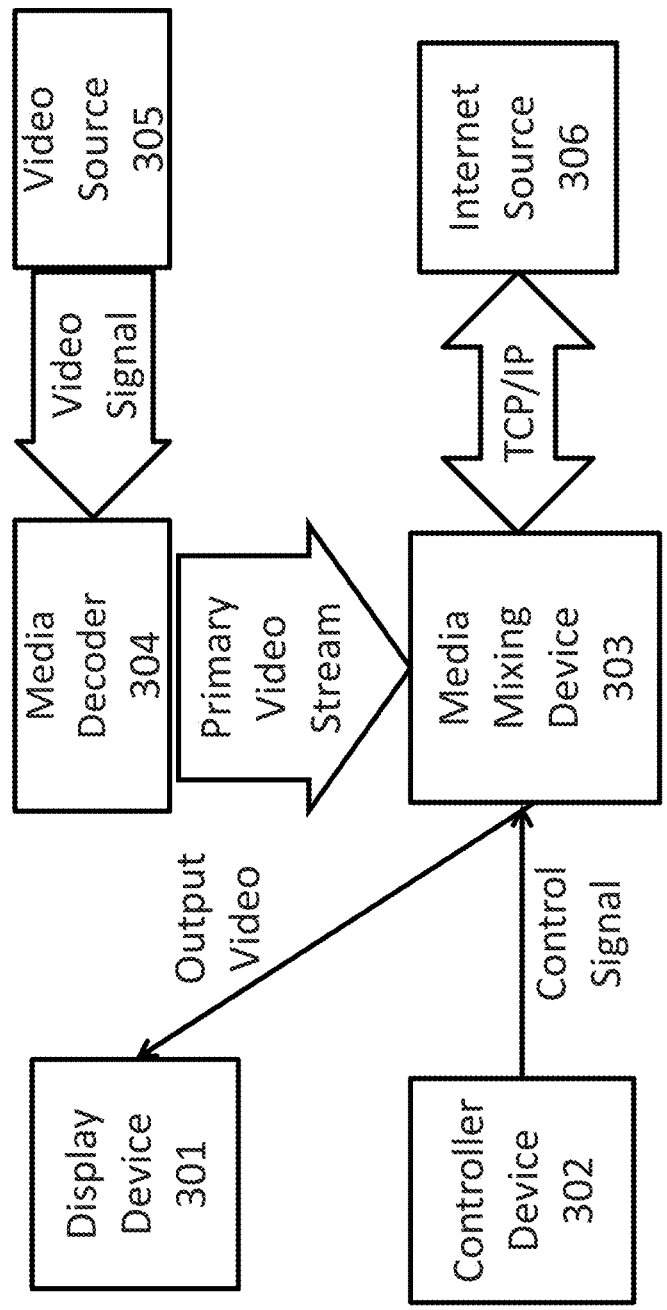
FIG. 3 is a block diagram illustrating the flow of information in accordance with certain embodiments of the disclosed subject matter.

FIG. 3 shows a system for use in performing some embodiments of the invention. For illustration, FIG. 3 is a simplified block diagram of the communication between a display device 301, a controller device 302, a media mixing device 303, a media decoder 304, a video content provider 305, and an Internet source 306.

The display device 301 of FIG. 3 can be any type of television display device. In some embodiments, the display device 301 can be a 3D television. In other embodiments, the display device 301 can be a 2D television. Display device 301 may be any output display, such as a consumer television, computer monitor, projector, or digital monitor at a specialized kiosk, capable of generating video and images from a digital output video signal. In some embodiments, the display device 301 may be an Internet-enabled electronic device, capable of receiving output video streams over the Internet from media mixing device 303. In some embodiments, the display device 301 has customized applications, or "apps," that allow access to a video signal from the media mixing device 303.

The controller device 302 is a device, such as a remote control, an input device, a tablet, or a smartphone, that can be used to control the display of secondary content on the display device 301 as described in more detail herein.

The video content provider 305 of FIG. 3, also called a video source, may be any number of networked data sources that provide video for consumption, such as a broadcast television network, a cable television network, an online streaming network, or the local cable network company or local broadcast affiliate. The video signal from the video content provider 305 may be transmitted via a number of media, including but not limited to broadcast airwaves, cable networking, the Internet, and even through phone lines. The video signal itself may be any video programming, including but not limited to television programming, cable programming, sports programming, or even videoconferencing data. The Internet source 306 can be a source of Internet content, such as a computer system, computer servers, or a computer network connected to the Internet for sending and receiving data. For example, the Internet source 306 may be servers located at Facebook™ or Twitter™ (for social media content), IMDB™ or Rotten Tomatoes™ (for media-related content), or NYTimes™ or CNN™ (for news content). The data can be from any one or more websites.

The media decoder 304 of FIG. 3 may be any number of devices or components that may be capable of receiving the video signal and processing it, including decoding it. In some embodiments, the media decoder 304 may be a set top box, a cable box, a digital video recorder, or a digital video receiver. In some embodiments, the media decoder 304 may be a set top box capable of receiving encrypted or unencrypted cable television signals. In some embodiments, the media decoder 304 may be integrated with the media mixing device 303 and display device 301.

The media mixing device 303 can be a device that blends the primary video stream with the secondary content overlay, as described in greater detail herein. The media mixing device 303 can then output the blended content to the display device 301 as shown in FIG. 3.

Figure 4:
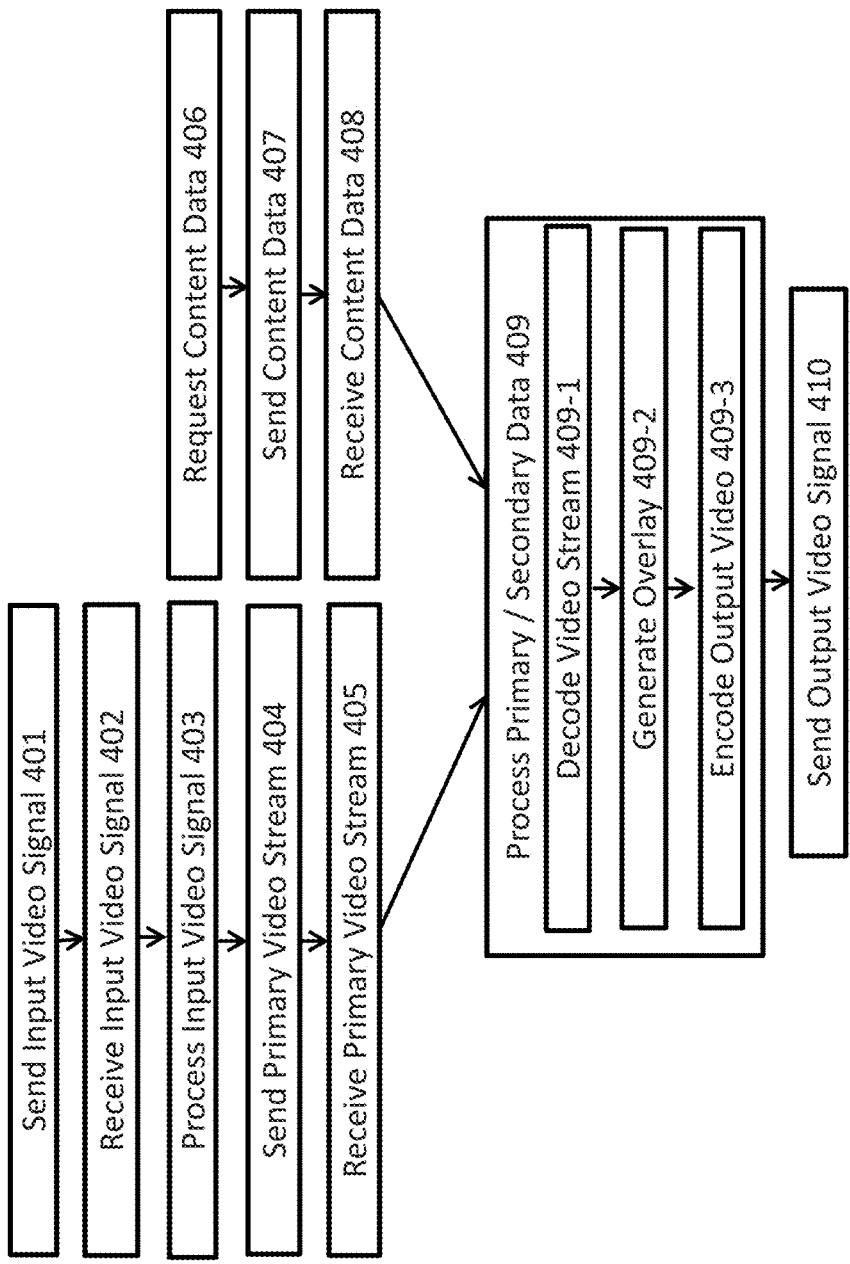
FIG. 4 is a flow diagram of a method in accordance with certain embodiments of the disclosed subject matter.
Figure 5:
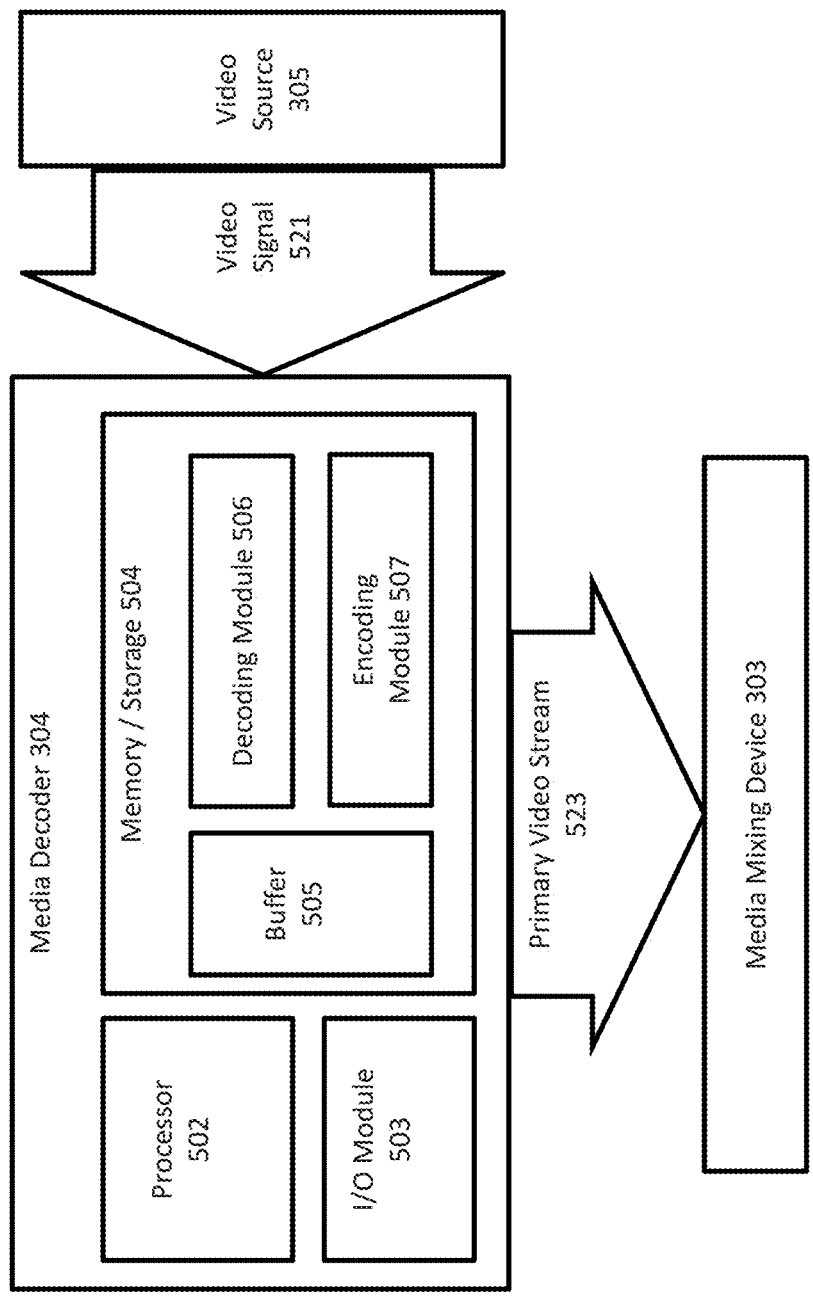
FIG. 5 is a block diagram that shows greater detail of the media decoder 304 from FIG. 3.

FIG. 5 is a block diagram of an embodiment of media decoder 304 of FIG. 3. This embodiment of media decoder 304 may include a processor 502, an input/output module 503, and a memory/storage module 504 including buffer 505, decoding module 506, and encoding module 507. Corresponding to block 402 in FIG. 4, media decoder 304 may receive the input video signal 521 from video source 305 through I/O module 503 and processor 502 may store the video signal data into buffer 505 prior to processing.

Processor 502 in the media decoder 304 of FIG. 3 can be configured as a central processing unit, graphics processing unit, or application processing unit. Processor 502 might also be implemented in hardware using an application specific integrated circuit (ASIC), programmable logic array (PLA), field programmable gate array (FPGA), or any other integrated circuit or circuit structure that can perform the functionality of the media decoder 304 of FIG. 3.

Input/output module 503 may include a specialized combination of circuitry (such as ports, interfaces, and wireless antennas) and software (such as drivers, firmware) capable of handling the receiving and transmission of data to and from video content provider 305 and to and from media mixing device 303 from FIG. 3. In some embodiments, input/output module 503 may include computing hardware and software components such as data ports, control/data/address buses, bus controllers, and input/output related firmware.

Memory/storage module 504 can be cache memory, flash memory, a magnetic disk drive, an optical drive, a programmable read-only memory (PROM), or any other memory or combination of memories. The memory/storage module 504, therefore, can be a non-transitory computer readable medium of a variety of types known to those skilled in the art.

Within memory/storage module 504, buffer 505 can be configured to provide temporary storage for digital data comprising the video signal from video content provider 305 and the primary video stream for media mixing device 303 in FIG. 3. Through the execution of instructions in the decoding module 506 and encoding module 507, processor 502 may use buffer 505 to temporarily store video data that has just been received or is about to be sent.

Decoding module 506 can be configured to decode the incoming video signal data from the video source 505. In some embodiments, decoding module 506 may include instructions for processor 502 to perform the necessary decoding calculations prior to re-encoding with the encoding module 507.

Encoding module 507 can be configured to encode the signal to form the outgoing primary video stream 523 for transmission to the media mixing device 303 from FIG. 3. In some embodiments, encoding module 507 may include instructions for processor 502 to perform the necessary encoding calculations prior to transmission of the primary video stream 523 through the input/output module 503.

Figure 6:
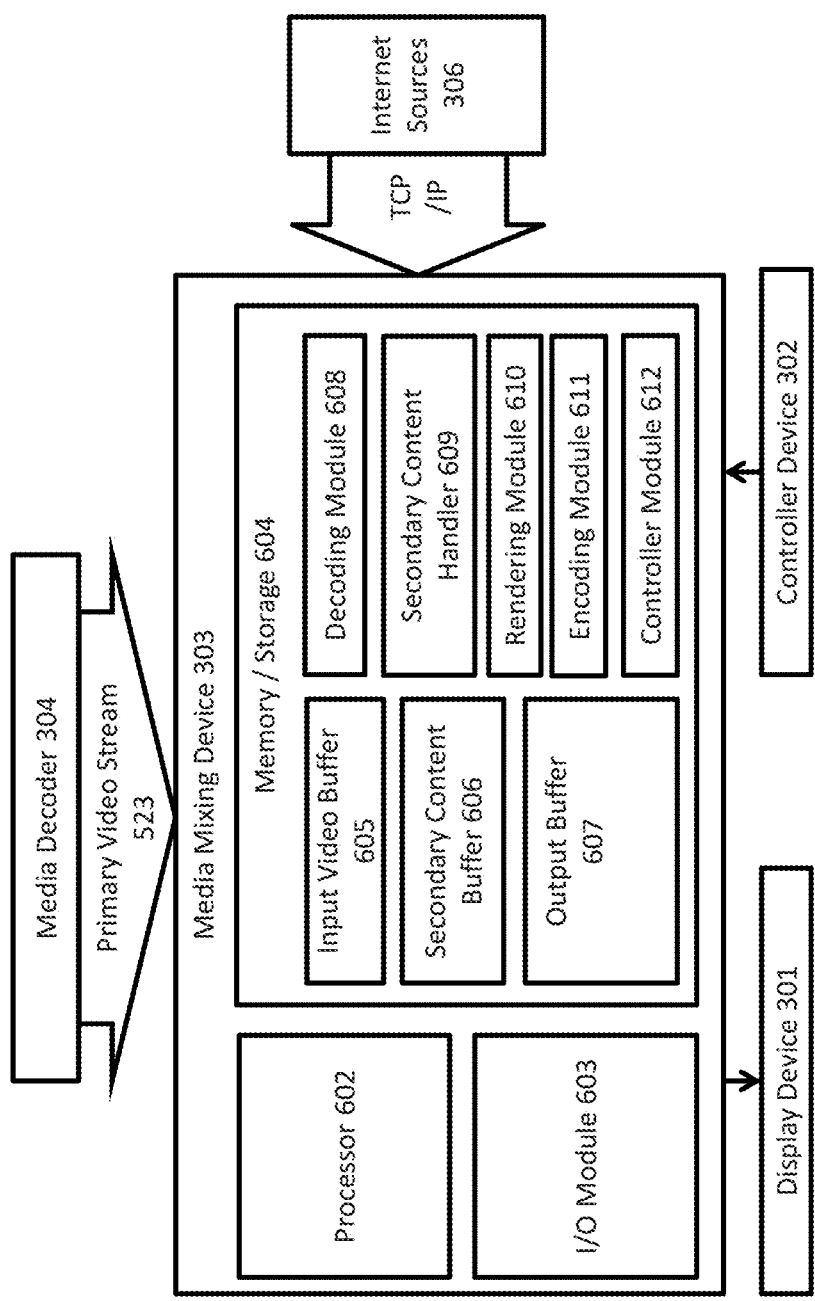
FIG. 6 is a block diagram that shows greater detail of the media mixing device 303 from FIG. 3.

FIG. 6 is a block diagram of an embodiment of media mixing device 303 of FIG. 3. This embodiment of media mixing device 303 includes a processor 602, an I/O module 603, and a memory/storage module 604 comprising input buffer 605, secondary content buffer 606, output buffer 607, decoding module 608, secondary content handler 609, rendering module 610, encoding module 611, and controller module 612. The media mixing device 303 may receive the primary video stream 523 from the media decoder 304 through the input/output module 603 of the media mixing device 303, and the processor 602 may store the primary video stream into input buffer 605 prior to processing. In some embodiments, processor 602 may store the primary video stream into the input buffer 605 after decoding using decoding module 608.

Processor 602 can be configured as a central processing unit, graphics processing unit, or application processing unit in media mixing device 303 from FIG. 3. Processor 602 might also be implemented in hardware using an application specific integrated circuit (ASIC), programmable logic array (PLA), field programmable gate array (FPGA), or any other integrated circuit or circuit structure that can perform the functionality of the media mixing device 303 of FIG. 3.

Input/output module 603 may include a specialized combination of circuitry (such as ports, interfaces, wireless antennas) and software (such as drivers, firmware) capable of (1) handling the receiving and transmission of data to and from media decoder 304, (2) receiving and transmitting output video to and from the display device 301 from FIG. 3, and (3) receiving and transmitting to and from the controller device 302 from FIG. 3. In some embodiments, input/output module 603 may include computing hardware and software components such as data ports, control/data/addresses buses, bus controllers, and input/output related firmware. In some embodiments, the input/output module 603 may be connected to the Internet and World-Wide Web.

Memory/storage module 604 can be cache memory, flash memory, a magnetic disk drive, an optical drive, a programmable read-only memory (PROM), or any other memory or combination of memories. The memory/storage module 604, therefore, can be a non-transitory computer readable medium of a variety of types known to those skilled in the art.

Within memory/storage module 604, input buffer 605 can be configured to provide temporary storage for digital data comprising the primary video stream from media decoder 304. Through the execution of instructions in the decoding module 608, processor 602 may use input buffer 605 to temporarily store video data that has been received from the media decoder 304. Secondary content buffer 606 can be configured to provide temporary storage for digital data comprising the secondary content received from Internet sources 306.

Output buffer 607 can be configured to provide temporary storage for digital data comprising the output video signal for the display device 301. Through the execution of instructions in the encoding module 611, processor 602 may use output buffer 607 to temporarily store video data prior to transmission. In some embodiments, the use of a separate input buffer and output buffer may be preferable due to the complex calculations and modifications to the video stream by the secondary content handler 609, rendering module 610, and encoding module 611 prior to transmission.

Decoding module 608 can be configured to decode the incoming video stream data from the media decoder 304. In some embodiments, decoding module 608 may comprise instructions for processor 602 to perform the necessary decoding calculations prior to rendering overlays in rendering module 610. In some embodiments, the decoding module 608 may be configured as a specialized combination of circuitry capable of decoding the primary video stream 523 prior to rendering in rendering module 610.

Secondary content handler 609 can be configured to handle the content data received from the Internet sources 306 via the input/output module 603. In some embodiments, secondary content data handler 608 may comprise instructions for processor 602 to parse and organize incoming secondary content data into input buffer 605 for use in rendering module 610 and encoding module 611. In some embodiments, the secondary content hander 608 may have instructions for organizing and arranging interfaces, handling application channels, organizing the secondary content within those overlays, and rearranging or translating the overlays over the primary video stream. Information may be sent to rendering module 610 to generate the overlay in the input buffer prior to mixing the primary video stream with the secondary content.

Rendering module 610 can be configured to generate the overlay for the display of secondary content data received from Internet sources 306 above the primary video stream originating from the video content provider 305. In some embodiments, the rendering module 610 may comprise instructions for processor 602 to calculate alpha-blending for transparency in the overlays. In some embodiments, the rendering module may be able to translate, resize, and change properties of the primary video stream. In some embodiments, the rendering module 610 may be configured as a specialized combination of circuitry capable of calculating alpha-blending for overlay transparency, and translating, resizing, and changing properties of the primary video stream. In some embodiments, decoding module 608 and rendering module 610 may together be a combination of specialized circuitry.

Encoding module 611 can be configured to encode the output video signal to the display device 301. In some embodiments, encoding module 611 may comprise instructions for processor 602 to perform the necessary encoding calculations prior to transmission of the output video signal through the input/output module 603. In some embodiments, encoding module 611 may be configured as a specialized combination of circuitry, such as a graphics processing unit, capable of performing the necessary encoding calculations prior to transmission of the output video signal.

Controller module 612 can be configured to manage and interpret the control signals received by the media mixing device 303 via its input/output module 603 from controller device 302. In some embodiments controller module 612 may comprise instructions for processor 602 to interpret the gestures from a user, such as waving, grabbing, or swiping with the controller device 302. In some embodiments, controller module 612 may be configured to "listen" for control signals on the input/output module 603 using processor 602.

In some embodiments, input buffer 605, output buffer 607, decoding module 608, secondary content handler 609, rendering module 610, encoding module 611, and controller module 612 may be implemented in hardware in combination with processor 602 as a single hardware device, such as an field programmable gate array (FPGA), an integrated silicon on a chip (SoC) device, or any variation of these devices.

FIG. 4 is a diagram of the information flow from the primary video content provider 305 and the Internet source 306 to the display device 301. In start block 401, the video content provider 305 sends a video signal to the media decoder 304. In block 402, the media decoder 304 may receive the video signal for processing.

In block 403 of FIG. 4, the media decoder 304 may process the video signal. In some embodiments, this may include decoding the video signal received from the video content provider 305 prior to encoding the video signal into the primary video stream. For example, in FIG. 5, processor 502 may decode the video signal data from buffer 505 using instructions from the decoding module 506 and then encode the resulting signal using encoding module 507 prior to transmission using input/output module 503.

In block 404 of FIG. 4, the media decoder 304 may send the primary video stream to media mixing device 303. As shown in FIG. 5, this step may be configured using processor 502 to transmit the encoded video stream stored in buffer 505 using the input/output module 503.

In block 405 of FIG. 4, the media mixing device 303 may receive the primary video stream from the media decoder 304. The media mixing device 303 may be any electronic computing device capable of decoding video streams from the media decoder 304 and the secondary content from Internet sources 306, such as a networked set top box or computer. In some embodiments, the media mixing device 303 may be a server or network of computing devices capable of (1) decoding a plurality of video streams from a plurality of media encoders and video sources, (2) transmitting output video to a plurality of display devices, and (3) receiving and sending control signals to a controller device 302 that may be connected over the Internet. In some embodiments, the media mixing device 303 may be integrated with media decoder 304 and display device 301 into a single unit.

In block 406 of FIG. 4, the media mixing device 303 may request content data from Internet source 306. In some embodiments, this request is communicated through the processor 602 executing instructions from the secondary content handler 609 in combination with the input/output module 603. The transmission of the request data may occur through a variety of mediums, such as a web interface, mobile interface, wire protocol, or shared data store such as a queue or similar construct. The connection may occur through software or hardware, so it can be language-independent, and may be initiated directly through a standardized interface (e.g., TCP/IP) or via a proprietary protocol from a software development kit or bundled set of libraries.

In some embodiments, the secondary content handler 609 manages the IP and web addresses for the respective Internet sources 106, such as Facebook™, Twitter™, newspaper and magazine websites. In some embodiments, the secondary content handler 609 may make use of RSS feeds and subscriptions to distill digital content from the Internet.

In block 407 of FIG. 4, the Internet source 306 may send secondary content data to the media mixing device 303. The transmission of secondary content data may occur through a variety of mediums, such as a web interface, mobile interface, wire protocol, or shared data store such as a queue or similar construct. The connection may occur through software or hardware, so it can be language-independent, and may be initiated directly through a standardized interface (e.g., TCP/IP as shown in FIG. 3) or via a proprietary protocol from a software development kit or bundled set of libraries. In some embodiments, the secondary content data transmission may be text, images, video or a combination of all three.

In block 408, the media mixing device 303 may receive the secondary content data from Internet source 106. As shown in the embodiment of FIG. 6, the media mixing device 303 may be configured to receive secondary content data through coordination between processor 602 and the input/output module 603. In some embodiments, this process is automated using the processor 602, input/output module 603, and secondary content handler 609. In some embodiments, the processor 602 may store the secondary content data in the input buffer 605 upon reception. In some embodiments, the processor 602 may store the secondary content data in the input buffer 605 only after decoding by the decoding module 608. In some embodiments, the reception of secondary content may be performed by a discrete content processor.

In block 409 of FIG. 4 the media mixing device 303 may process the data received from the media encoder 303 (if any) and the Internet source 306 (if any). In some embodiments, this process involves several sub-processes as shown by blocks 409-1 through 409-3.

In block 409-1, the primary video stream 523 received during block 405 may be decoded by the processor 602 in combination with the decoding module 608. In some embodiments, the primary video stream 523 may be decoded into uncompressed bitmapped images, organized frame-by-frame. After decoding the video stream into a digital format that is easily manipulated, such as an uncompressed stream of bitmapped images, the processor 602 may store the video stream into input buffer 605. In some embodiments, the decoding process is very minimal, such as when the primary video stream is received as uncompressed video and audio through HDMI.

In block 409-2, the media mixing device 303 may generate an overlay over the primary video stream and its constituent video frames. In some embodiments, this may involve generating a single transparent layer from multiple overlays of secondary content. In some embodiments, this may be generated through coordination between processor 602, secondary content handler 609, and the rendering module 610. In block 409-3, the manipulated video stream may be encoded for output to the display device 301. In some embodiments, this may involve the coordination of the processor 602 and the encoding module 611 to encode the video into a format that may be processed by the display device 301. In some embodiments, the encoding may be very minimal, such as to generate an uncompressed video stream for an HDMI transmission. Once the video stream is encoded, the resulting data is stored in the output buffer 607 prior to transmission. Block 410 of FIG. 4 involves the transmission of the output video signal, with overlay(s), to the display device 301 for display.

Referring again to block 409-2 of FIG. 4 for generating an overlay over the primary video stream, in some embodiments, the overlay size and shape may be determined by the screen size and the secondary content for display, as controlled by the secondary content handler 609 and calculated by the processor 602. Based on instructions from the controller module 612, the processor 602 and rendering module 610 may also determine the location of the overlay on the screen. Once the location and size of the overlay have been determined, the processor 602 and rendering module 610 may generate an overlay layer that includes all the secondary content over a transparent background, then this overlay may overwrite the pixels of the constituent video frames (stored in the input buffer 605) that are beneath the overlay with the color and transparency level of the overlay. In that way, the layer formed by the overlay may appear to visually sit above the primary video stream during playback.

Figure 10:
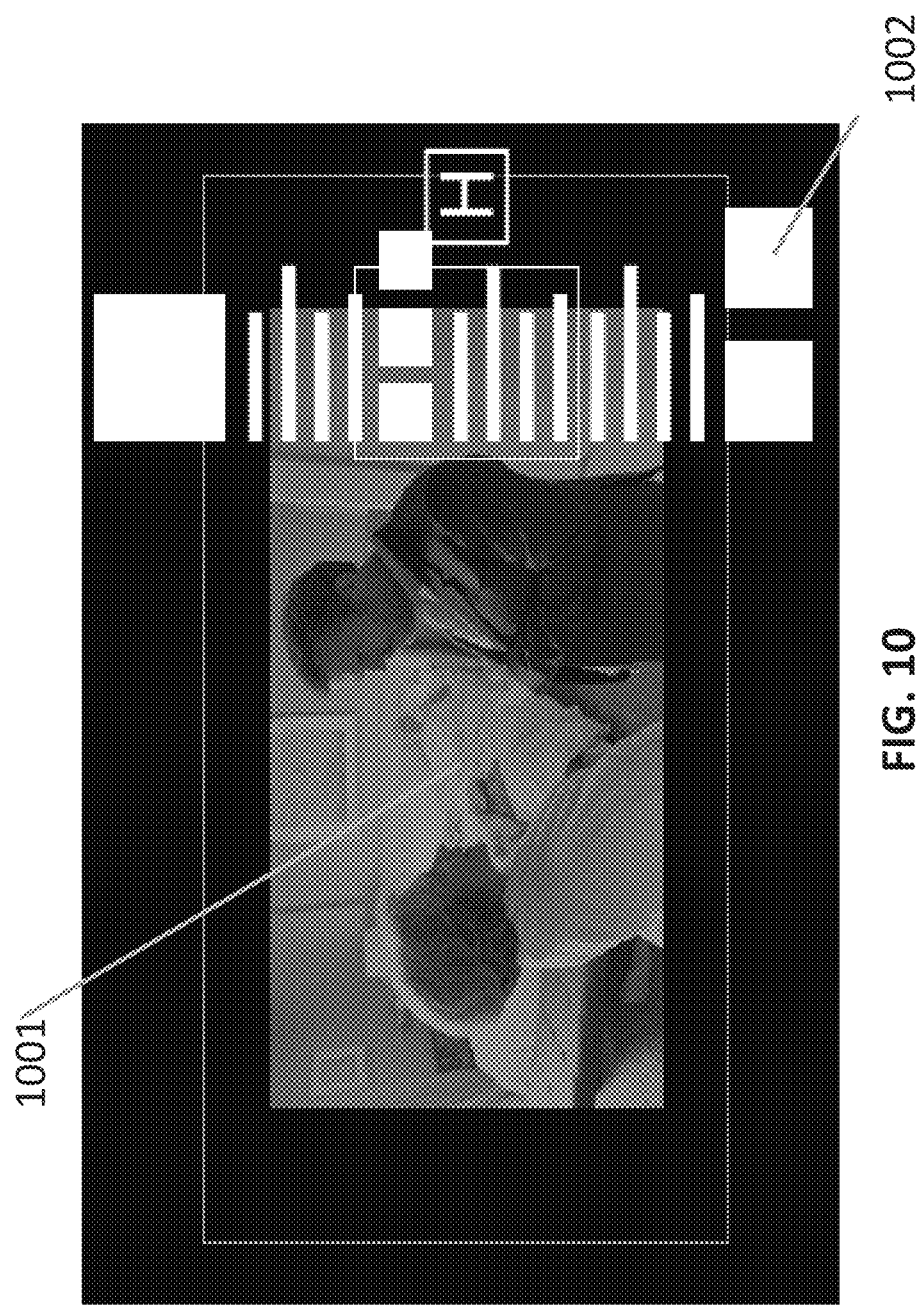
FIG. 10 illustrates the use of secondary content in a transparent three-dimensional layer in accordance with certain embodiments of the disclosed subject matter.

FIG. 10 shows a primary video stream 1001 with a layer of secondary content 1002. In order to generate the overlays and video stream in block 409-2 as shown in FIG. 10, the processor 602 and rendering module 610 calculate where the secondary content 1002 may overlay the primary video stream 1001. In two-dimensional embodiments, where the overlay occurs, the processor 602 must overwrite the corresponding pixel color of the primary video stream with the pixel color that corresponds with the overlapping secondary content 1002. By repeatedly checking the secondary content 1002 and the primary video stream 1001 for overlaying pixels, the processor can form the overlay content by editing the color and transparency of the overlay layer and the primary video stream 1001.

Depending on the embodiment, secondary content in block 409-2 may be added to the overlays. In the embodiment of FIG. 6, the addition of secondary content to the overlays may be handled through coordination between the rendering module 610, the secondary content handler 609, and the processor 602. In some embodiments, the location of the secondary content may be determined by the design of the overlay as handled by the rendering module 610 and processor 602. Once the location of the secondary content has been determined, the corresponding pixels may be updated to incorporate the secondary content into the individual frame as coordinated by the rendering module 610, processor 602, and the secondary content handler 609. As the overlays containing secondary content are integrated into the video frame pixel-by-pixel, the video stream may be stored in the input buffer 605 prior to encoding.

Figure 13:
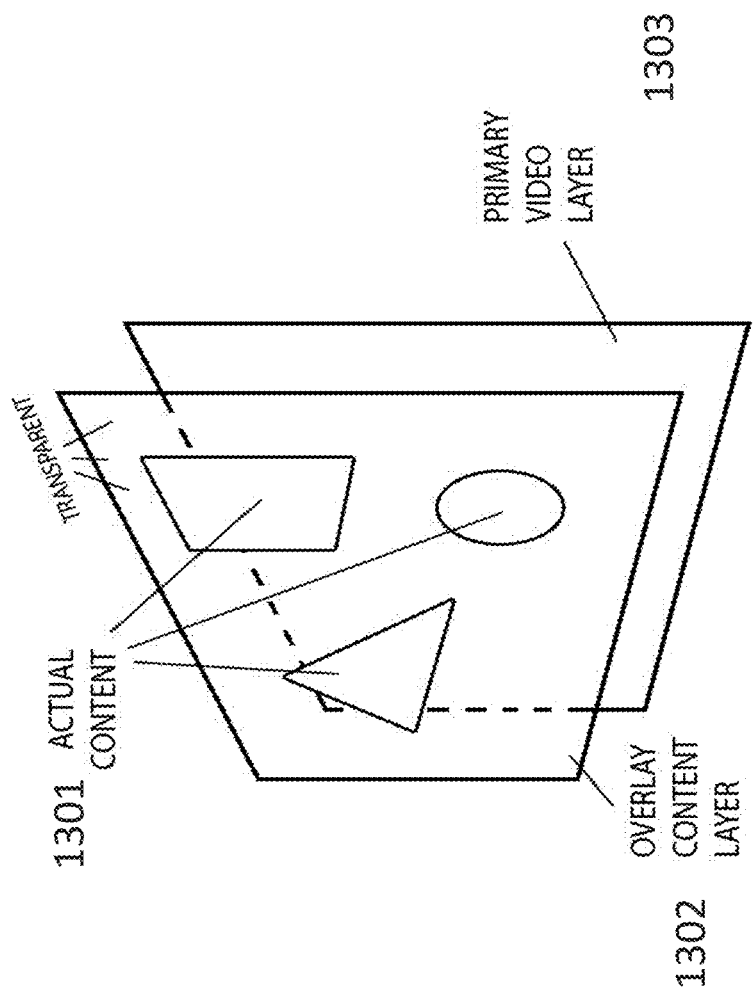
FIG. 13 is a block diagram that illustrates how multiple overlays may be combined into a single, transparent overlay content layer above the primary video layer.

In some embodiments, the secondary content may be integrated into a single transparent layer as shown in FIG. 13. In FIG. 13, the entirety of the secondary content 1301 is rendered into a single, transparent overlay content layer 1302 that may then be blended or mixed with the primary video layer 1303 (i.e., the underlying television stream) for encoding prior to transmission to the display device 301 from FIG. 3. For example, if the secondary content is an Internet webpage, the layer may have to be large enough to display the page or at least a portion of the page, ideally without any horizontal scrolling.

Figure 9:
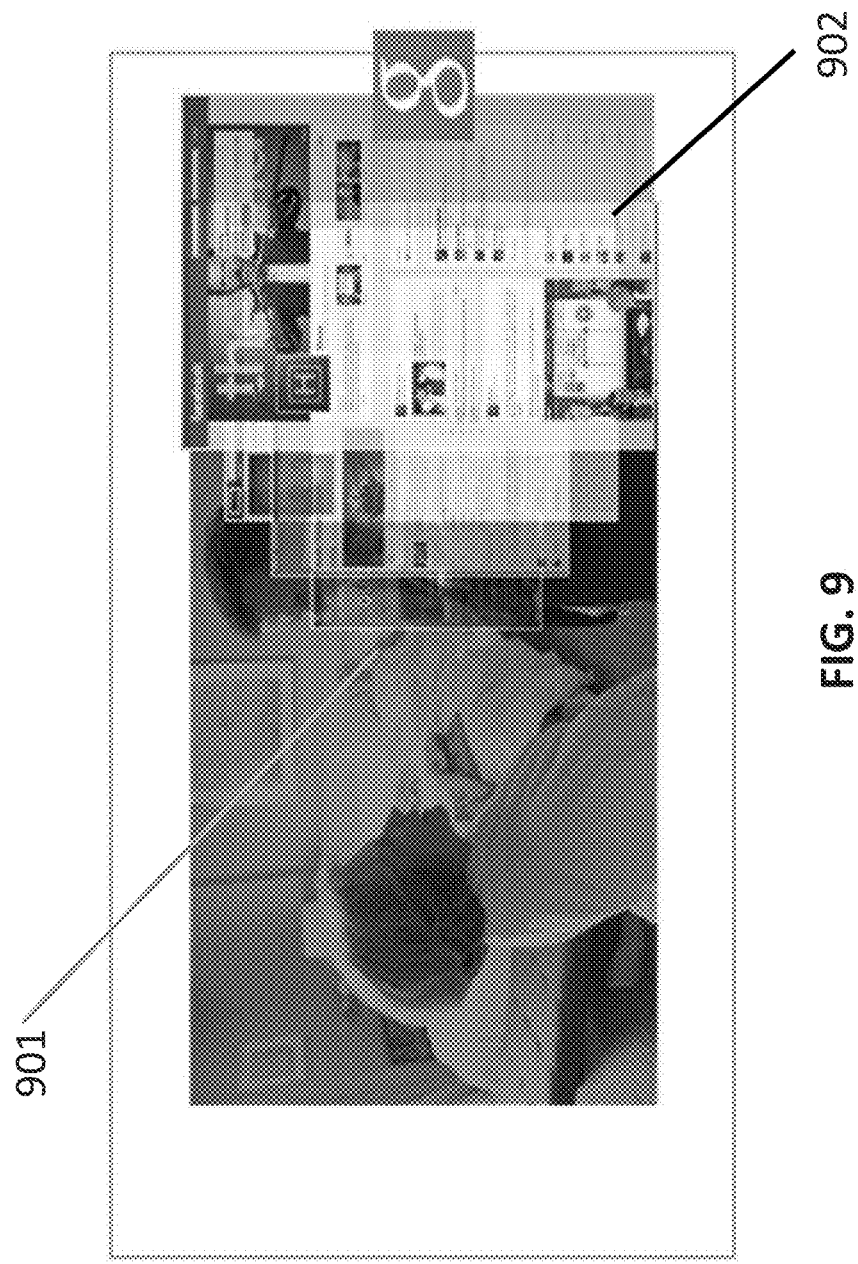
FIG. 9 illustrates the use of secondary content in an alpha-blended three-dimensional layer in accordance with certain embodiments of the disclosed subject matter.

FIG. 9 is an example of a webpage 902 being incorporated into one of many layers over a primary video stream 901. Having determined the size of webpage onscreen, the processor 602 and rendering module 610 of FIG. 6 may have to determine the respective pixels that are "covered" by the display of the webpage onscreen. Following that determination, the pixels may then be overwritten with the pixels required to display the webpage.

In other embodiments, the secondary content may be carefully displayed so that most of the primary video stream is not obscured. In FIG. 10, transparency in the secondary content ensures that the impact to the primary video stream 1001 from secondary content 1002 is minimized.

In addition to determining the size and shape of the overlay, the rendering module 610 of FIG. 6 may also generate partially transparent overlays using alpha blending. The term "transparent" herein does not mean entirely transparent, but instead means an overlay that can be at least partially seen through so that the content beneath the transparent overlay can be seen. Alpha-blending is the process of combining a translucent foreground color with a background color to produce a blended color. In alpha-blending, the pixel data contains additional bits to calculate shades of blending. For example, a pixel may contain 24-bits of data for red, blue, and green hues (RGB), with each color hue represented by 8 bits to denote a value ranging from 0 to 255. Pixels for alpha-blending may use an additional 8 bits to indicate 256 shades of blending. In combination with the processor 602, the rendering module 610 may compare the overlay location, identify the appropriate pixel in the overlay, identify the corresponding pixel in the primary video stream (stored in the input buffer 605), compare the pixel colors, and determine an appropriate pixel shading. Once the pixel shading has been determined, the processor 602 may overwrite the individual pixel with the appropriate color.

In an embodiment that uses 256 levels of transparency to represent blending, 8 bits may represent an alpha value. The values may range from 0 (where the pixel may be completely transparent) to 255 (entire pixel may be completely opaque). When a pixel in the secondary content overlay ("foreground") and a pixel in the primary video content ("background") overlap, the resulting color of that pixel may be calculated by combining the red, green, blue and alpha values of the foreground pixel and background pixel to generate a pixel color to be displayed. For example, the output RGB pixel may be calculated as follows:

outputRed=(foregroundRed*foregroundAlpha)+
(backgroundRed*(255−foregroundAlpha));

outputBlue=(foregroundBlue*foregroundAlpha)+
(backgroundBlue*(255−foregroundAlpha));

outputGreen=(foregroundGreen*foregroundAlpha)+
(backgroundGreen*(255−foregroundAlpha)

In some embodiments, a customized method for transferring pixel data with alpha-blended values may be used by the processor 602, rendering module 610, and/or the encoding module 611. Generally, the secondary content overlay may be stored in input video buffer 605 using four channels per pixel: Red channel, Green channel, Blue channel, and Alpha channel ("RGBA"). In some embodiments, however, the rendering module 610 and/or encoding module 611 may only accept three channels of data through its port at any given time, e.g., for use of the HDMI specification, which only accounts for red, green, and blue pixel data.

When sequentially transferring four channels of data through the three input channels, collection of the pixel data may get complicated. As shown in FIG. 15, sequential data collection of RGBA (red, green, blue, alpha) data results in different locations of the red, green, blue and alpha data depending on the dataset. For example, 1501 represents a sample RGBA data stream. On the first pass 1502, the inputs to encoding module 611 may only accept RGB data for the first pixel. On the second pass 1503, the trailing alpha data occupies the first channel, while the second and third channels receive only the red and green data of the second pixel. On the third pass 1504, the blue and alpha data from the second pixel occupy the first and second channels while the third channel receives the red data from the third pixel. It is only on the fourth pass 1505 when the remaining green, blue and alpha data is received for the third pixel. Thus, transferring four channels of data through the three channel input requires additional management and coordination by the encoding module 611 in order to receive, collect and properly organize RGBA data. This potentially increases the computational load on the encoding module 611 and can slow down the video processing.

Figure 16:
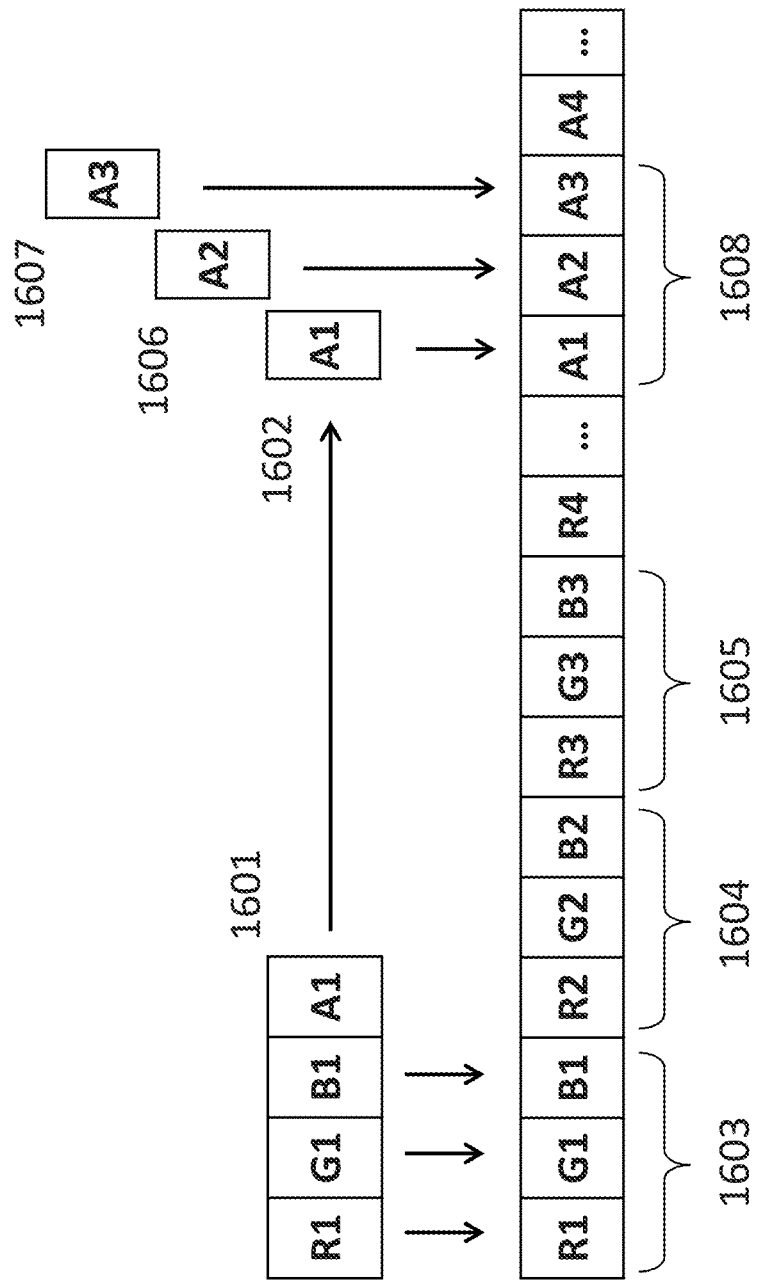
FIG. 16 is a block diagram that illustrates how alpha-blended pixel data may be organized for more efficient transmission and encoding.

FIG. 16 illustrates a more efficient methodology for transferring RGBA pixel data into a three-channel encoding module 611, e.g., a device designed to accept only three channels of pixel data consistent with the HDMI specification. As shown in FIG. 16, in some embodiments, RGBA data for Pixel 1 in sequence 1601 may be separated into RGB data 1603 and alpha data 1602. In some embodiments, processor 602 and rendering module 610 may then send the RGB data to an encoding module 611 with a three-channeled input, shown in FIG. 16 as the three channels of 1603. The encoding module 611 may then buffer the RGB data accordingly, such as by placement in output buffer 607. This process may then be repeated for every single pixel in the row of the image, e.g., 1920 pixels in 1080p high-definition television. For example, the RGB data for Pixel 2 may be sent to the encoding module 611 as shown in 1604. Similarly, the RGB data for Pixel 3 may be sent to the encoding module 611 as shown in 1605. Each time, the alpha data for Pixel 2 and Pixel 3 is split from their respective RGB data as shown in alpha bits 1606 and 1607. Once the RGB data has been transferred, processor 602 and rendering module 610 may proceed to transfer the corresponding alpha data bits to the encoding module 611. Unlike the RGB data transfer, alpha data for multiple pixels may be stacked into a single transfer, as shown in multiple alpha bits 1608s where alpha data for pixels 1, 2, and 3 (represented by 1602, 1606 and 1607 respectively) are shown to be transferred all at once. Once transferred, the encoding module 611 may then sequentially store the alpha data bits in a buffer in preparation for the alpha-blending calculation. Hence, in this embodiment, there is no need to employ complicated logic to determine the significance of the data on each input channel.

There are several advantages to this methodology and system of RGBA pixel data transfer. First, it is less computationally expensive because the encoding module 611 need not worry about the channel location for the red, green, blue, and alpha data. Second, because each pixel has three channels (RGB) and only one alpha channel, it is possible to transfer the alpha channel of three pixels from the secondary overlay in a single pass as shown in 1606. This efficiency may reduce the buffer size accorded to the alpha data by two-thirds. Third, these efficiencies make possible the use of alpha-blending on a variety of less-powerful hardware profiles that were originally designed to receive only three-channel HDMI pixel data.

Upon completion of the alpha-blending operation, the processor 602 may store the pixel in the input buffer 605 of FIG. 6. This operation may continue for all the pixels in all the video frames of the video stream. In some embodiments, this computation may be done in real-time while the video stream is populating the input buffer.

In some embodiments, the secondary content may be organized around "digital channels." FIG. 12 illustrates how secondary content may be organized into "digital channels" 1201. In some embodiments, the channels may allow access to content from Internet websites, such as Facebook™, Twitter™, CNN™, NYTimes™, Google™. In some embodiments, there may be a channel that functions as a web browser.

In some embodiments, the digital channels may be displayed on a layer on the left side of the screen, while the content of the digital channel may be available on the right side of the screen. For example, FIG. 12A illustrates how an array of channels 1201 may be shown on the left side of the screen. In FIG. 12A, the layer 1201 is transparent, while the logos (e.g., Facebook™, Twitter™, CNN™, NYTimes™, Google™) within layer 1201 are not. Hence, each video frame requires that the overlapped pixels from the primary video stream be substituted with the appropriate pixel from the logo. Similarly, in FIG. 12C, the "digital channels" 1203 are organized in a column.

Depending on the channel selected, the viewer may select information to be viewed. As Facebook™ is centered on the screen in FIG. 12A, information from facebook.com may be viewed on the right side of the screen as shown in 1202 in FIG. 12B. In FIG. 12B, the layers are of 1202 are transparent, thus using alpha-blending, while the Facebook™ logo is not. Accordingly, the pixels forming the layer 1202 require alpha blending calculations and computations, while the Facebook™ logo may only require a pixel for pixel substitution in the video frame.

Similarly, if the viewer were to scroll upwards, as in FIG. 12C, they would be able to view information gathered from Twitter™, as shown in layer 1204 in FIG. 12D. All of this access would be running simultaneously with the primary video stream on the display.

Figure 11:
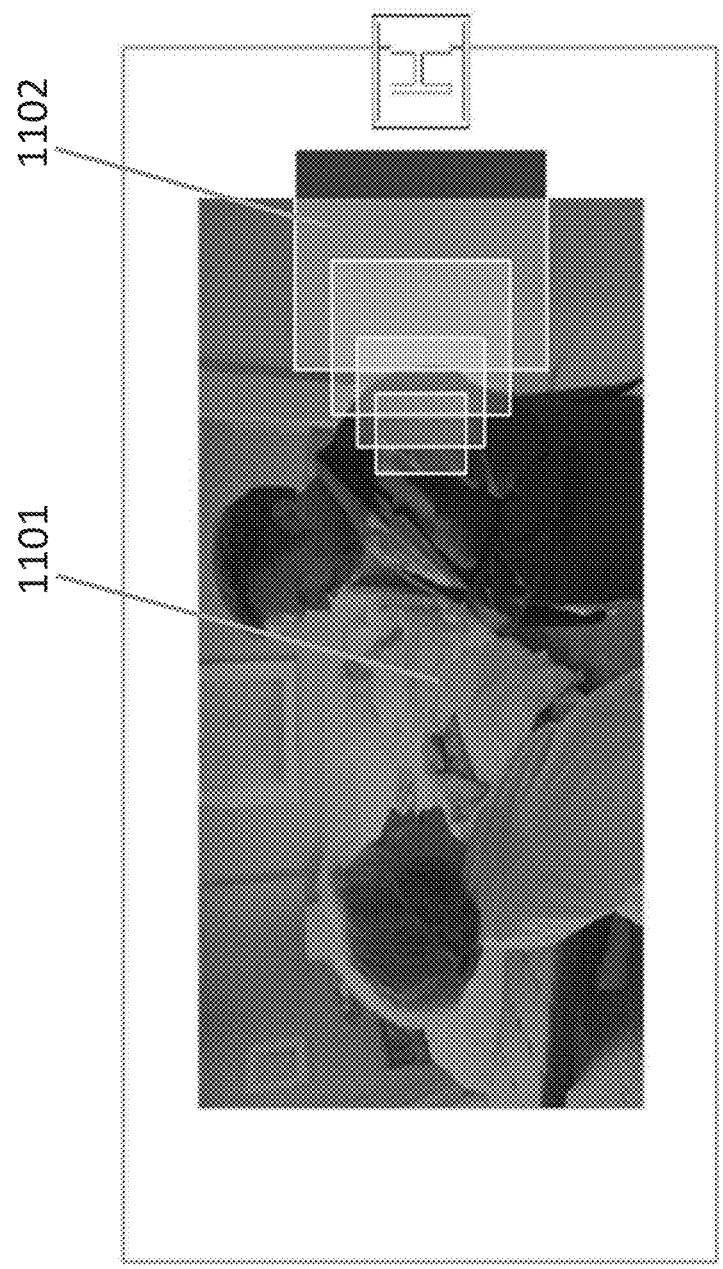
FIG. 11 illustrates the use of alpha-blending in a three-dimensional layer in accordance with certain embodiments of the disclosed subject matter.

In some embodiments, there may be multiple layers overlaying primary video content. In some embodiments, those layers may be organized based on "height" above the screen. For example, elements on a flat screen may be organized in two dimensions using x- and y-coordinates as shown in screen 101 in FIG. 1. Elements in the "interaction space" 103 of FIG. 1 may also be organized based on their distance away from the screen, i.e., z-coordinate. In other words, different layers may sit at different distances in front of the screen based on different z-coordinates. In some embodiments, the layers may be scaled based on their distance from the screen. For example, in FIG. 9, the layers closer to the screen are scaled smaller in order to create a greater sense of distance from the viewer, such as webpage 902 from FIG. 9. Similarly, referring to FIG. 11, the layers behind layer 1102 are scaled smaller than layer 1102 itself.

In some embodiments, multiple layers make use of alpha-blending to create transparency. For example, webpage 902 in FIG. 9, layer 1102 in FIG. 11, layer 1202 in FIG. 12B, and layer 1204 in FIG. 12D are transparent. Accordingly, in some embodiments, the processor 602 and rendering module 610 of FIG. 6 may compare each and every overlay layer to the combination of pixel shading that has been determined by the primary video stream and the layer below it. For example, where there are three overlays (lowest, middle, upper) above the primary video stream, the processor 602 and the rendering module 610 may compare the location of the lowest overlay, identify the appropriate pixel in the lowest overlay, identify the corresponding pixel in the primary video stream (stored in the input buffer 605), compare the pixel colors, determine an appropriate pixel shading, and overwrite the corresponding pixel in the input buffer 605.

Next, the processor 602 and the rendering module 610 may compare the location of the middle overlay, identify the appropriate pixel in the middle overlay, identify the corresponding pixel stored in the input buffer 605, compare the pixel colors, determine an appropriate pixel shading, and overwrite the corresponding pixel in the input buffer 605.

Finally, the processor 602 and the rendering module 610 may compare the location of the upper overlay, identify the appropriate pixel in the upper overlay, identify the corresponding pixel stored in the input buffer 605, compare the pixel colors, determine an appropriate pixel shading, and overwrite the corresponding pixel in the input buffer 605.

FIG. 14 illustrates how computational vectors may be used to render either a two- (FIG. 14A) or three-dimensional image (FIG. 14B) in some embodiments. As shown in FIG. 14A, computational vectors based on a single camera position 1403 may be used to render the scene of the primary video stream 1401 and the overlay in the screen frame 1402. As shown in FIG. 14B, three-dimensional computational vectors based on two camera positions, 1406 and 1407 respectively, may be used to render the three-dimensional image of primary video stream 1404 and the overlay in the screen frame 1405 using the processor 602. The processor 602 may then rasterize a three-dimensional pixel onto a two-dimensional plane (which may be the screen) based on the camera (eye) position using vector math.

Referring again to block 409-3 from FIG. 4 for encoding an output for the display device 301, in some embodiments, the video stream may be encoded for three-dimensional display. In some embodiments, this may involve the processor 602 and the encoding module 611 of FIG. 6 to encode video for stereoscopic three-dimensional display, where a mirror image may be generated to create a three-dimensional effect. In some embodiments, this requires encoding a mirror video with distance offsets for three-dimensional stereoscopic depth. In some embodiments, the output video stream may be encoded for three-dimensional side-by-side transmission. In some embodiments, the output video stream may be encoded for three-dimensional sequential transmission. In some embodiments, this three-dimensional encoding is limited entirely to the layers containing the secondary content.

In block 409, the manipulated video stream may be sent to display device 301 from media mixing device 303. In some embodiments, this may involve the processor 602 loading the data from the output buffer 607 into the input/output component 603 for sending to the display device 301. As with other transmissions, the connection may occur through a variety of mediums, such as a protocol over a HDMI cable or other forms of digital video transmission. In some embodiments, the manipulated video stream may be sent over the Internet to an Internet-connected display device.

Figure 7:
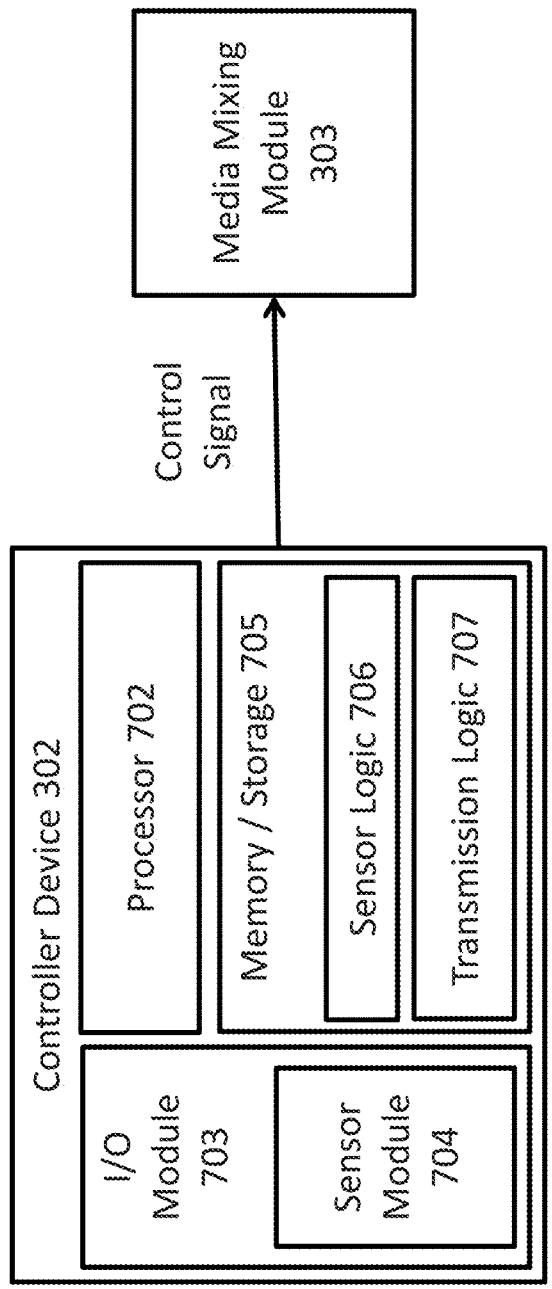
FIG. 7 is a block diagram that shows greater detail of the controller device 302 from FIG. 3.

Referring again to FIG. 3, some embodiments of the invention also include a controller device 302 capable of recognizing gestures from a viewer. FIG. 7 is a block diagram of one embodiment of the controller device 302. As shown in FIG. 7, controller device 302 may comprise processor 702, input/output module 703 with sensor module 704, and memory/storage module 705 which may comprise sensor logic 706 and transmission logic 707.

As with the processor 502 in FIG. 5 and processor 602 in FIG. 6, processor 702 can be configured as a central processing unit, graphics processing unit, or application processing unit in the controller device 302 from FIG. 3. Processor 702 might also be implemented in hardware using an application specific integrated circuit (ASIC), programmable logic array (PLA), field programmable gate array (FPGA), or any other integrated circuit or circuit structure that can perform the functionality of the controller device 302 from FIG. 3.

As with input/output 503 module in FIG. 5 and input/output module 603 in FIG. 6, input output module 703 may comprise a specialized combination of circuitry (such as ports, interfaces, wireless antennas) and software (such as drivers, firmware) capable of handling the receiving sensor input signals from the viewer and sending data to media mixing device 303 from FIG. 3. In some embodiments, input/output module 703 may comprise computing hardware and software components such as data ports, control/data/address buses, bus controllers, and input/output related firmware. In some embodiments, the input/output module 703 may be configured to send control signals from controller device 302 to media mixing device 303 over the Internet.

Within input/output module 703, sensor module 704 may be configured to detect signals corresponding to gestures from a user/viewer. In some embodiments, where the controller device is embodied by a touchscreen-enabled device, the sensor module 704 may be configured to detect electrical traces that are generated by the capacitance created at a touchscreen by a finger touch, press, or swipe. Based on the viewer's gesture, the capacitive touchscreen may capture a path of motion over an interval of time. In embodiments with a touchscreen interface, the touchscreen interface can have no custom buttons or keys for input from the user. Instead, in these embodiments, the entire touchscreen can be used for input through gestures in an interface without buttons or keys for input.

In some embodiments, where the controller device 302 is embodied by an optical sensor, such as a camera, the sensor module 704 may be configured to detect light patterns generated by reflections or refractions of a known emitted light signal. In some embodiments, the sensor module 704 may be configured to detect a speckled light pattern. In some embodiments, the sensor module 704 may be configured to use an infrared emitted light signal.

As with memory/storage module 504 in FIG. 5 and memory/storage module 604 in FIG. 6, memory/storage module 705 can be cache memory, flash memory, a magnetic disk drive, an optical drive, a programmable read-only memory (PROM), or any other memory or combination of memories. The memory/storage module 705, therefore, can be a non-transitory computer readable medium of a variety of types known to those skilled in the art.

Within memory/storage module 705, the sensor logic 706 may be configured to interpret the signals detected by the sensor module 704. In some embodiments, for example, the sensor logic 706 may be configured to sample signals using the sensor module 704 over an interval of time in order to detect motion. In some embodiments, the sensor logic 706 may be configured to filter noise from the signals received from the sensor module 704.

The transmission logic 707 may be configured to organize and detect gesture information to the media mixing device 303. In some embodiments, the transmission logic 707 may comprise instructions for processor 702 to compute location, direction, and velocity of a viewer's gesture. In some embodiments, the transmission logic 707 may be configured to assist with the transmission of the gesture information over the Internet.

In some embodiments, the controller device 302 can be a tablet, smartphone, or other handheld device with the sensor and transmission logic 706, 707 in the form of an app that is stored in the memory 705 to perform the logic described herein. In these embodiments, the I/O module 703 and sensor module 704 can be the standard equipment that is part of the tablet, smartphone, or handheld device, such as a capacitive touchscreen sensor and controller.

Figure 8:
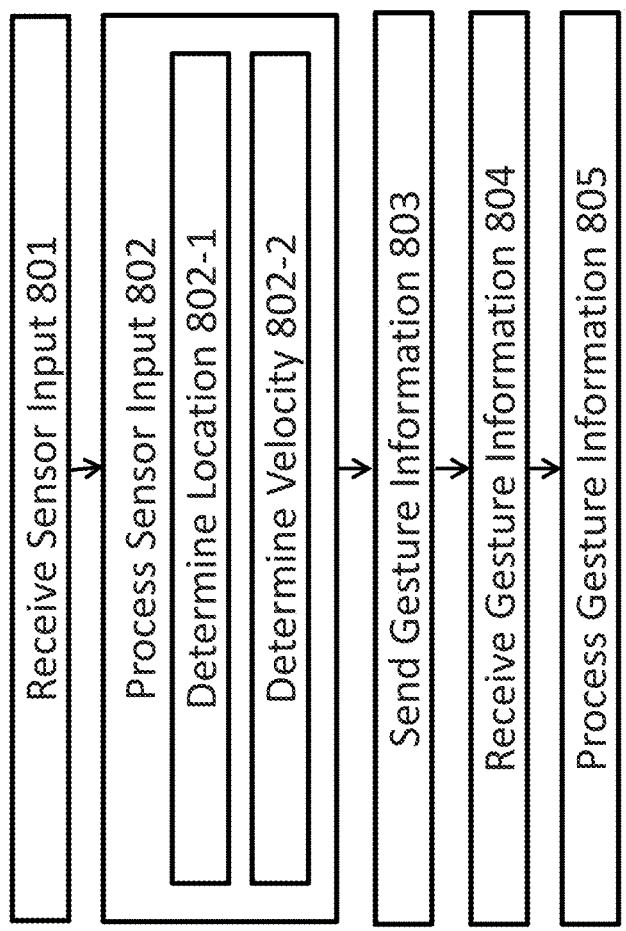
FIG. 8 is a flow chart of a method in accordance with certain embodiments of the disclosed subject matter.

FIG. 8 is a flow diagram illustrating how the gestures of a viewer may be sent to the media mixing device 303 using controller device 302. In start block 801, the sensor module 704 receives signals from a viewer's gesture. In some embodiments, where the controller device 301 is embodied by a touchscreen-enabled device, the signals may be capacitive traces generated by contact between the touchscreen and a fingertip.

In some embodiments, where the controller device 302 is embodied by an optical sensor, such as a camera, the signals may be light patterns generated by reflections or refractions of a known emitted light signal. In some embodiments, the light pattern may be speckled. In some embodiments, the emitted light signal may be infrared.

In block 802, the sensor signals can be processed prior to transmission to the media mixing device 303. In some embodiments, the determination of gestures may comprise determining location and velocity.

In block 802-1, the location of the gesture may be determined by different ways depending on the embodiment. For example, in embodiments where the controller device 302 includes a capacitive touchscreen, the location can be determined by locating the capacitive signals according to a Cartesian grid on the touchscreen. By comparing the relative strengths of the capacitive signal, the location of the user's input may be located on the screen. For example, using the strongest signals may be indicative of the user's input and the starting point of a gesture.

In embodiments where the controller device may be embodied by an optical sensor, the location of the gesture may be determined by analyzing the reflections, refractions, and intensity of signals as derivations of a known, emitted light signal of pre-determined intensity, wavelength, and pattern. For example, in some embodiments, where light may be reflected, the viewer's (gesture) may be detected. Where there is no reflection, the sensor detects that there is no subject in the line of sight. Similarly, the sensor may detect how far away the subject is from the camera based on the intensity of the reflection. Closer objects may reflect more light to the sensor. Objects farther away may deflect photons away from the sensor.

Some embodiments may use a depth sensor consisting of an infrared laser projector combined with a sensor to capture video data in 3D under any ambient light conditions. In some embodiments, the sensing range of the depth sensor may be adjustable, with the processor capable of automatically calibrating the sensor based on the content displayed onscreen and the user's physical environment. In other embodiments, two (or more) cameras may be used to capture close range gesture control by measuring the differences between the images to get the distance of the gestures.

In block 802-2, the processor 702 and sensor logic 706 may determine velocity, i.e. speed and direction, by comparing time-lapsed signals from the sensor module 704. Based on the difference in the signal locations and the time elapsed, the processor 702 may determine speed and direction of the viewer's gesture. For example, the processor 702 and sensor logic 706 may determine the start of a user's gesture at one location, detect the user's signal at another location, and then detect the user's signal at yet a different location. By connecting the dots, the processor 702 and sensor logic 706 may determine what gesture the user is attempting to make. Based on the time interval, the user may detect the speed with which the user is making the gesture as well.

In block 803, the gesture information may be transmitted from the control device 302 to the media mixing device 303. In some embodiments, this may involve connecting to the media mixing device 303 via the input/output module and transmitting the signal via wireless technologies (e.g., WiFi, Bluetooth) or via wired communications (e.g., Ethernet, USB). In some embodiments, this may involve sending the information along internal buses if the controller device 302 is integrated with the media mixing device 303.

In block 804, the gesture information may be received by the media mixing device 303 via its input/output module 603 shown in FIG. 6. In some embodiments, upon receiving the gesture information, the processor 602, in combination with the controller module 612, may load the gesture information into the input buffer 605 for temporary storage. In some embodiments, the gesture information may not be loaded until processing.

In block 805, gesture information may be processed and analyzed by the processor 602 and controller module 612. In some embodiments, the processor 602 and controller module 612 may use the gesture information to alter the location of the layer and type of secondary content in combination with the rendering module 610 and the secondary content handler 609. For example, where the gesture indicates that the viewer would like to move the layers around the screen, the gesture motion may be processed by the processor 602, controller module 612, and rendering module 610 to translate/move the layer onscreen.

Depending on the gesture, for example, the layers may be moved, translated and manipulated by the viewer. For example, FIG. 12 illustrates how gestures may manipulate a layer to select alternative secondary content. In FIG. 12A, the Facebook™ logo is aligned with the center of the screen. In order to view content from Twitter™, the layer needs to be scrolled downwards so that the Twitter logo is aligned with the vertical center as shown in FIG. 12C. To trigger that downward scroll, the sensor module may be configured to detect specific gestures. In embodiments where the controller device 302 is touchscreen enabled, a downward scroll may be triggered by a downwards finger swipe or an upwards finger swipe, depending on preference. In embodiments where the controller device 302 is configured around an optical camera, a downward scroll may be triggered by an upwards wave of the hand or a downwards wave of the hand, depending on preference.

Similarly, gestures may trigger the selection of a specific type of secondary content. For example, in FIG. 12A, the Facebook™ logo is aligned with the center of the screen. Selection of that content may be triggered by gestures. For example, to trigger selection, in embodiments where the controller device 302 is touchscreen-enabled, a horizontal swipe from left to right may indicate selection. For example, upon a horizontal swipe from left to right in FIG. 12A, Facebook™ content can be displayed in greater detail on the right of the screen, as shown in FIG. 12B. Similarly, in embodiments where the controller device 302 is configured to use an optical camera, a horizontal wave of the hand from left to right may indicate selection. Similarly, those gestures may be used to select content from Twitter™ as shown in FIGS. 12C and 12D, where FIG. 12D shows Twitter™ content displayed on the right side of the screen.

Gestures may also be applied to deselect a content feed and return to the channel selection layer. For example, in embodiments where the controller device 302 is touchscreen-enabled, a horizontal swipe from right to left may indicate de-selection. Similarly, in embodiments where the controller device 302 is configured with an optical camera, a horizontal wave of the hand from right to left may indicate de-selection. These gestures may be used, for example, to de-select content feeds from FIGS. 12B and 12D to return to the screens shown in FIGS. 12A and 12C respectively. For example, in a touchscreen embodiment, when the content of FIG. 12B is displayed on the right of the screen, a swipe from right to left on the touchscreen of the controller device 302 can cause the screen to appear as in FIG. 12A.

Gestures may also be applied to show or hide the content layers above the primary video stream. For example, in embodiments where the controller device 302 is touchscreen-enabled, a multi-fingered swipe upwards may hide the layers. Conversely, a multi-fingered swipe downwards may show the layers onscreen. Similarly, in embodiments where the controller device 302 is configured with an optical camera, a wave of the hand vertically upwards may hide the layers, while a wave of the hand vertically downwards may show the layers onscreen.

Figure 17:
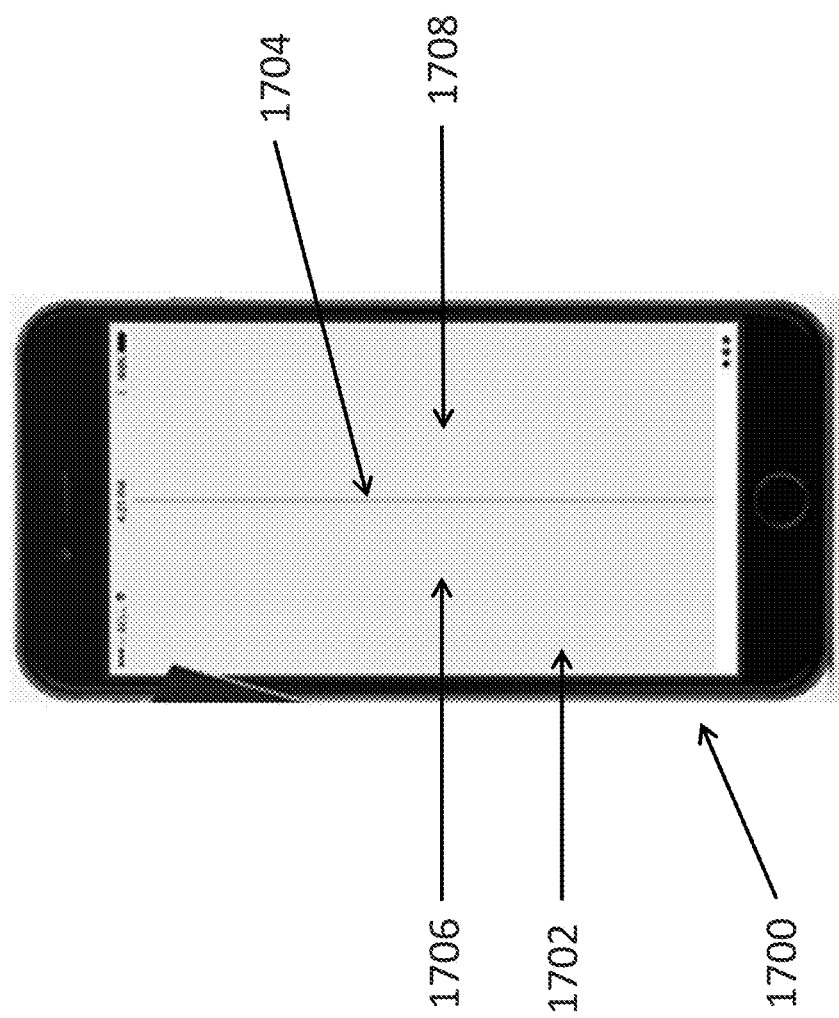
FIG. 17 is an exemplary user interface for a touch screen device that can be used to control a separate display device.

FIG. 17 is an exemplary controller 1700 having a user interface 1702 on a touchscreen display for use for controlling secondary digital content on a separate display device (not shown). The controller 1700 of FIG. 17 can have many of the same features as the controller device 302 of FIG. 7. For example, the controller 1700 can include a processor 702, input/output module 703 with sensor module 704, and memory/storage module 705 that may include sensor logic 706 and transmission logic 707. These features can be similar to those described in connection with FIG. 7. In other embodiments, the controller 1700 can have a different configuration.

The controller 1700, for instance, can include a touch interface device, a processor, and a memory storing non-transitory instructions for controlling the processor to perform the operations described below during execution. In one embodiment, the touch interface device can be a touchpad (not shown) that controls a separate display screen or device. In such an embodiment, the controller can be implemented in any type of device including a touchpad, including, for example, a laptop computer. In another embodiment, the touch interface device can be a touchscreen display, such as that shown in FIG. 17. The embodiment of FIG. 17 shows a user interface 1702 on the touchscreen display of a smartphone. In other embodiments using a touchscreen display, the controller 1700 can be implemented in a tablet or in another type of electronic device. In any event, the controller 1700 can execute instructions to interpret each type of gesture described herein so that the user can navigate through a display device. In some embodiments, the mixing device 303 described above can aid in interpreting the gestures picked up by the controller 1700 and can display the secondary digital content on the display device in the manner described herein. Accordingly, when the term controller is used herein, it can encompass a controller itself that is separate from the mixing device, or the combination of the controller 1700 and the mixing device. In addition, the instructions for interpreting the gestures described herein can be stored in one or both of the mixing device and the controller, so that the combination of the two can perform the operations described herein.

Referring again to FIG. 17, the user interface 1702 can, in one embodiment, be divided into a left side 1706 and a right side 1708 by a line 1704 from top-to-bottom. In other words, the line 1704 separates the user interface 1702 into the left side 1706 and the right side 1708. In addition, in this embodiment, the user interface 1702 includes no custom buttons or keys for input purposes. Instead, only the line 1702 is present on the user interface (aside from time information, connectivity information, and the like as shown on the upper portion of the user interface 1702, if desired). The controller 1700 itself can, of course, contain other buttons or keys, but the user interface 1702 itself, in this embodiment, contains no custom buttons or keys for user input purposes. In other embodiments, the user interface may contain custom buttons or keys, as long as it is also able to perform the other functions described herein.

During operation, the instructions for controlling the processor can be executed to display the user interface 1702 on the touch screen display, where the user interface 1702 includes only a line 1704 from top-to-bottom separating the interface 1702 into a left side 1706 and a right side 1708, wherein the user interface includes no custom buttons or keys. After this, the user interface 1702 can be used to control a display screen in the manner described below. Further, in embodiments in which the controller includes a touchpad and not a touch screen display, this step of "displaying" need not take place.

In other embodiments, the user interface 1702 can be structured so that it is rotated by ninety degrees. In such an embodiment, for instance, the line 1704 would extend from left to right separating the interface 1702 into a bottom portion and a top portion (instead of a vertical line separating the user interface into a left side and a right side). Other orientations of the user interface 1702 are also possible within the scope of the invention.

FIGS. 18-26 are illustrative examples of an exemplary user interface 1702 on a controller device 1700 that is separate from a display screen 1800 on which secondary digital content 1804 is displayed in an overlay above a primary video stream 1802. These figures depict how the secondary digital content 1804 on the display screen 1800 can be controlled through gestures with the controller 1700. In addition, each figure contains an X-Y-Z coordinate system 1806 to show the X, Y, and Z directions. In particular, the X-Y plane is on the surface of the display screen 1800 itself. The Z-space, on the other hand, is a simulated Z-space that is in an interaction space in front of the television. This simulated Z-space represents, in some embodiments, a 3D visual effect. The secondary digital content 1804 can be seen to extend beyond the display screen 1800 itself, as may appear in 3D. In other embodiments, this secondary digital content 1804 fully appears on the display screen 1800 itself. The controller 1700 and user interface 1702 in FIGS. 18-26 are the same as that shown in FIG. 17, although it should be understood that a different user interface 1702 could be used, and that the controller 1700 could be implemented as a touchpad rather than a touch display screen. Although many of the examples that follow will be given with reference to input gestures on a touch screen display of the controller (as for controller 1700 depicted on the figures, where the touch sensitive surface and the display are combined), in some embodiments, the controller includes a touchpad that detects inputs on a touch sensitive surface that is separate from the display screen 1800. In some embodiments, the touch sensitive surface may or may not include the line 1704 (whether it is in a vertical orientation as depicted, or in a horizontal or other orientation). In accordance with the embodiments, the touch interface device (whether it is a touch display screen or touchpad) detects one or more contacts or gestures at locations, and the controller can interpret these contacts or gestures. Further, the user can interact with the touch interface device to control the display of secondary digital content 1804 on the display screen 1800 in a natural way so that it feels to the user as if the user is grabbing and moving around the secondary digital content 1804 on the display screen 1800.

Figure 18:
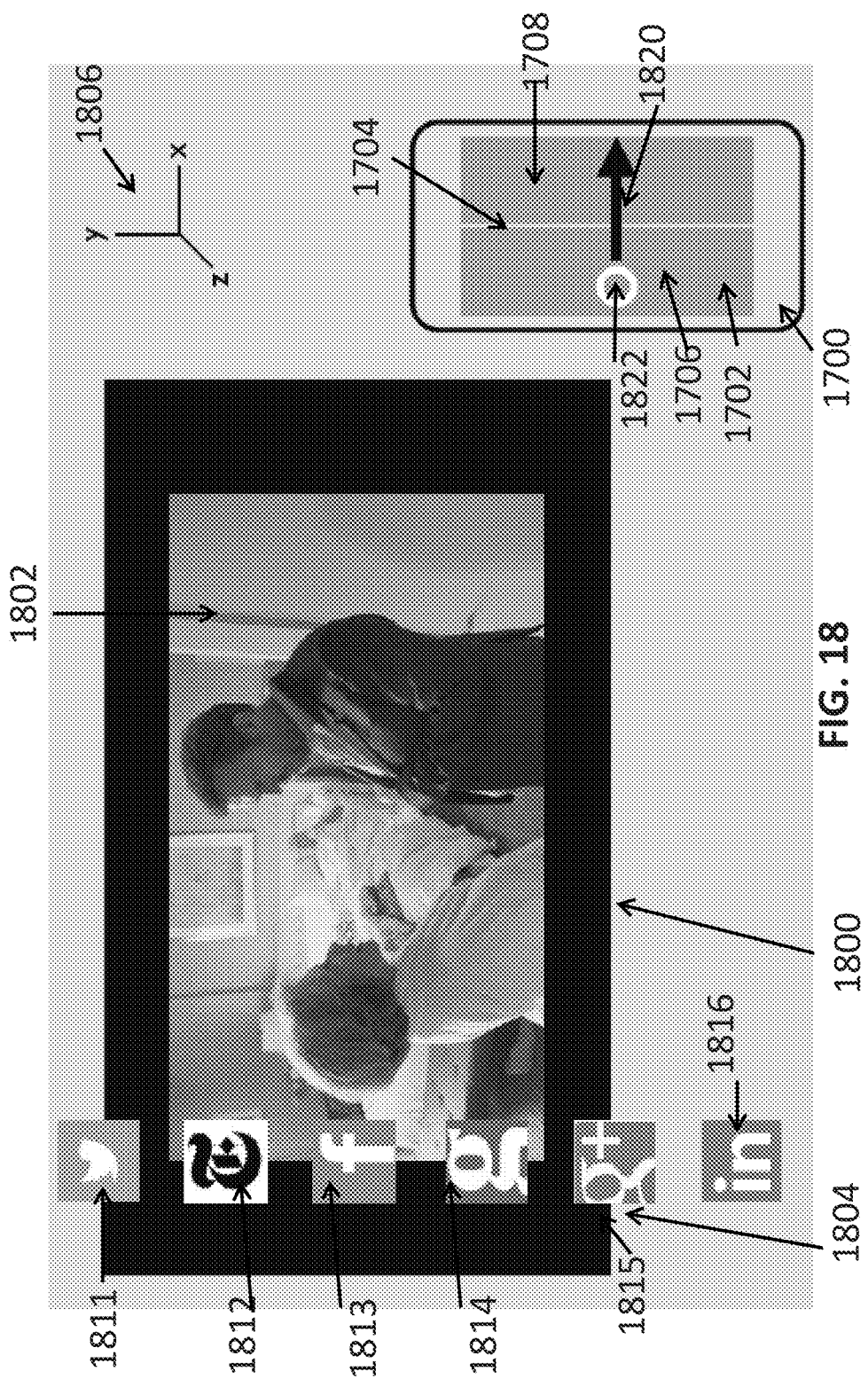
FIG. 18 illustrates an exemplary user interface for the controller of FIG. 17, as well as a display screen with secondary digital content that can be controlled through the use of the user interface of the controller.

Referring now to FIG. 18, the controller 1700 can be used to display a plurality of icons 1811-1816 for different applications. For example, FIG. 18 shows, among others, icons for Twitter™ 1811, Facebook™ 1813, and Google™ 1814. The applications shown in FIG. 18 are exemplary only, and a variety of different applications can be used in various embodiments. In some embodiments, for example, custom applications that are tied to certain types of primary video can be displayed. In one embodiment, in order to display the applications, the user can click twice on the touch interface device. For example, if the secondary digital content 1804 is not displayed on the display screen 1800, the user can click twice (i.e., tap twice) on the user interface 1702 in order to display the secondary digital content 1804. This tapping can be considered an initial input gesture that displays the secondary digital content 1804. In FIG. 18, the displayed secondary digital content 1804 includes icons 1811-1816 for various applications.

Figure 19:
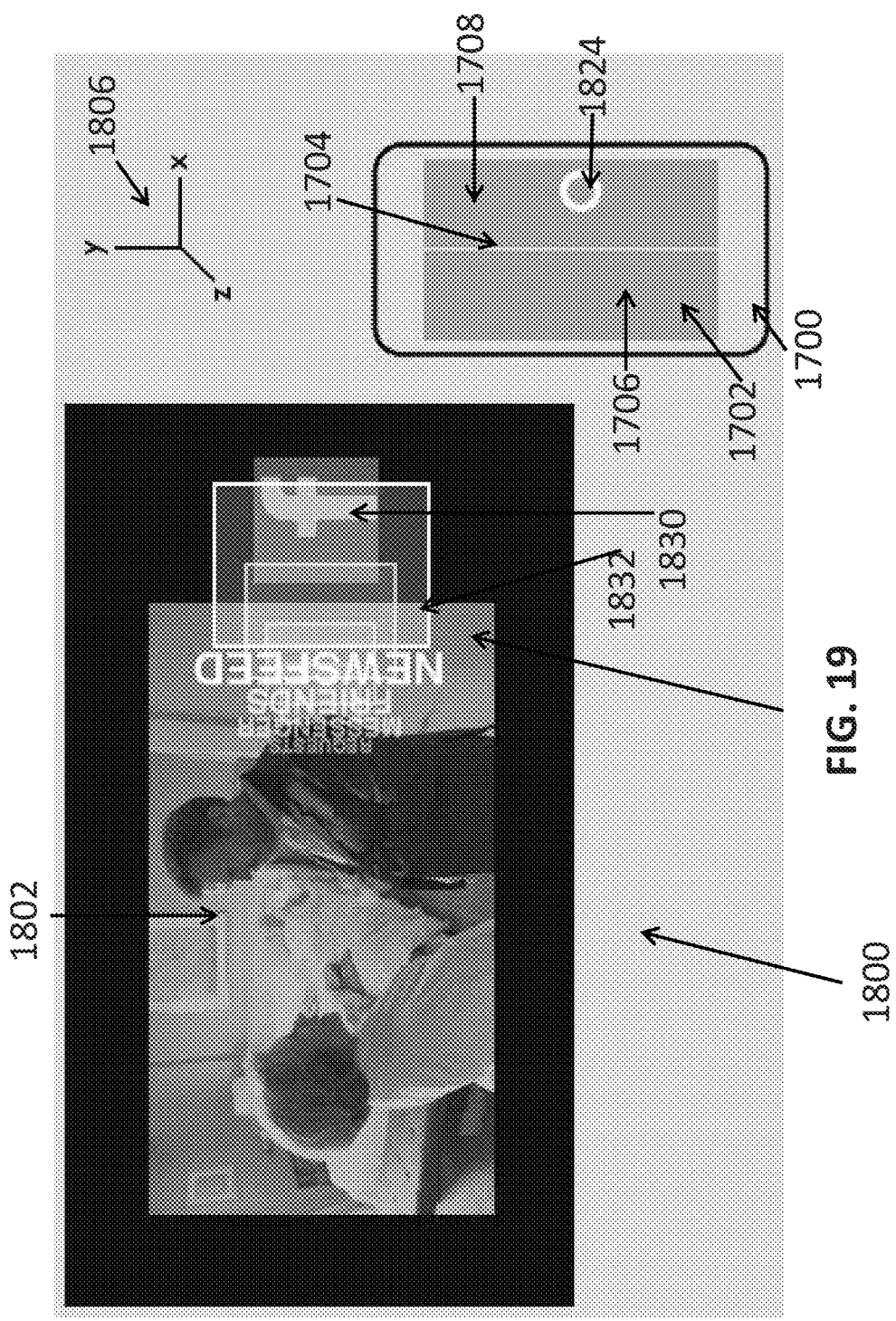
FIG. 19 illustrates an exemplary user interface for the controller of FIGS. 17 and 18, as well as the state of the display screen with secondary digital content after the input gesture shown in FIG. 18.

After the icons 1811-1816 for applications have been displayed on the display screen 1800, the user can control this secondary digital content 1804 through the use of input gestures. The input gestures can be of a variety of types. A first input gesture can relate to selecting or opening up an application. This input gesture 1820 is shown on FIG. 18. The state of the display screen 1800 before this input gesture 1820 is shown on FIG. 18, and the state of the display screen after this input gesture 1820 is shown on FIG. 19. Initially, the instructions detect this first input gesture 1820 by a user on the touch interface device. In the embodiment of FIG. 18, this first input gesture is a gesture 1820 from the left side 1706 to the right side 1708 of the touch interface device. The gesture 1820 (shown with the arrow from left to right 1820) begins at a starting point 1822 on the left side 1706 of the touch interface device and ends at a point on the right side 1708 of the touch interface device (in other words, it starts on the left of line 1704 and ends on the right of line 1704. Before using this gesture 1820, the user can move up and/or down on the list of icons 1811-1816 so that an icon for a desired application has been selected. The selected icon can be shown as larger than the others to indicate that it is the currently-selected icon. After this, the user can use the gesture 1820 from left to right in order to open up the application, which results in the display screen 1800 showing the secondary digital content 1804, including the opened application, as shown in FIG. 19. On the user interface 1702, FIG. 19 shows only the ending point 1824 of the gesture 1820 shown on FIG. 18. Thus, the result of the first gesture is to select an application for display on the display screen 1800. In the example of FIG. 19, the selected application is Facebook™, as indicated by numeral 1830. In other words, in response to detecting the first input gesture 1820, the step of selecting an application (here, Facebook™ 1830) for display on the display screen 1800 from a set of two or more applications (icons 1811-1816) displayed on the display screen 1800 is performed. As set forth above, the two or more applications (i.e., the icons 1811-1816 for these applications) are the secondary digital content 1804 displayed in the overlay above the primary video stream 1802 on the display screen 1800.

Referring still to FIG. 19, the displayed application can be displayed in a variety of layers. For example, in FIG. 19 in which Facebook™ is displayed, the "NEWSFEED" layer is the current displayed layer, and this is depicted as a box indicating layer 1832. The "NEWSFEED" layer is in the front in FIG. 19. FIG. 19 also depicts three additional layers, called "FRIENDS," "MESSENGER," and "REQUESTS," which are in the rear behind the "NEWSFEED" layer. In other words, the "NEWSFEED" layer is the currently-displayed layer for which secondary digital content is shown, and the detailed content for the other three layers is not currently shown, but is instead in the rear.

The layers of FIG. 19 can be done as described above in connection with FIGS. 11 and 12. In other words, there may be multiple layers of secondary digital content 1804 overlaying primary video content 1802. In some embodiments, those layers may be organized based on "height" above the screen. For example, elements on a flat screen may be organized in two dimensions using x- and y-coordinates. Elements in the "interaction space" may also be organized based on their distance away from the screen, i.e., z-coordinate. In other words, different layers may sit at different distances in front of the screen based on different z-coordinates. In some embodiments, the layers may be scaled based on their distance from the screen.

Figure 20:
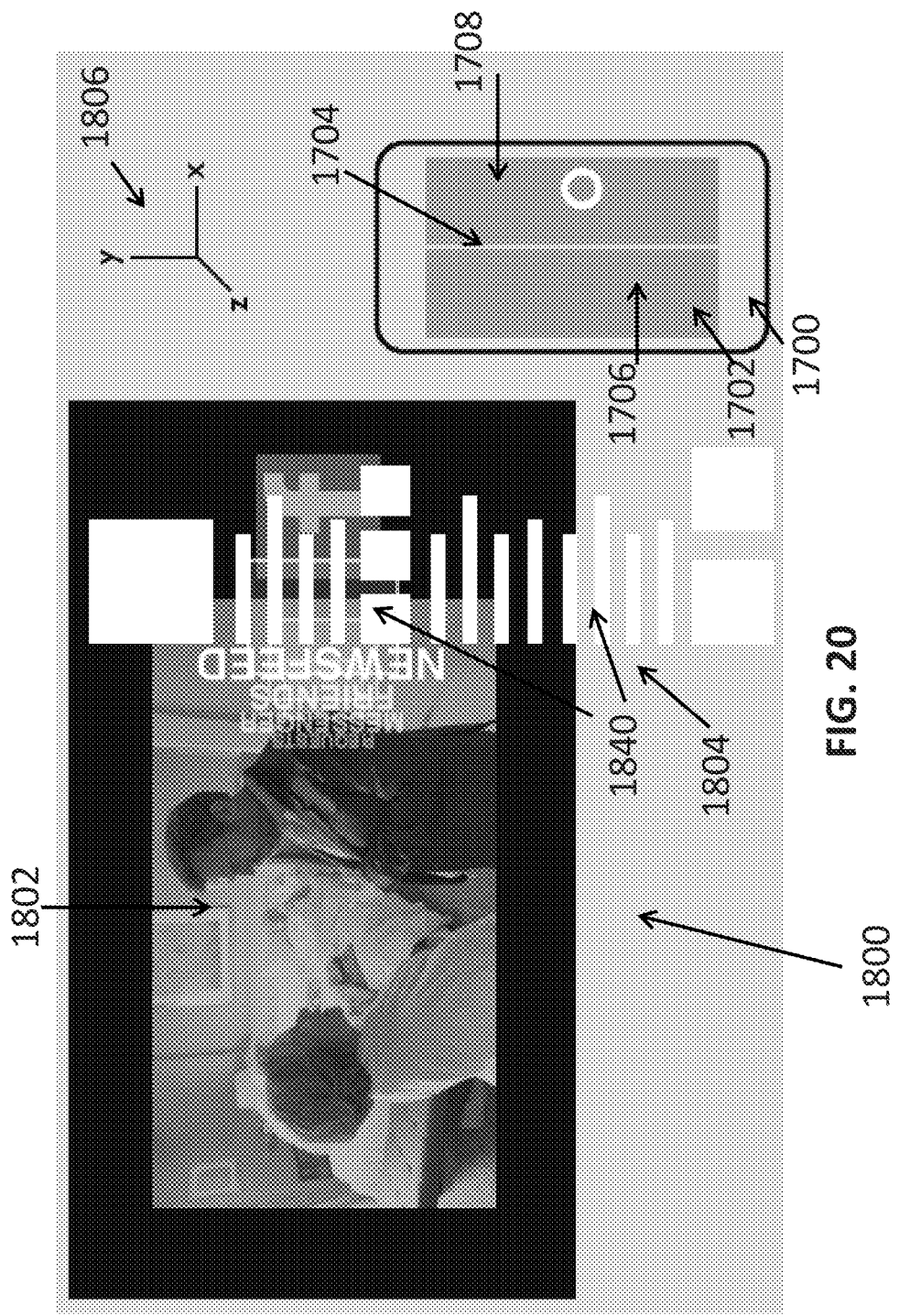
FIG. 20 illustrates an exemplary user interface for the controller of FIG. 17, as well as a display screen with secondary digital content in the form of a NEWSFEED layer.

Referring now to FIG. 20, detailed information items 1840 are shown for the "NEWSFEED" layer of the secondary digital content 1804. In some embodiments, tapping the touch interface device twice when the display screen 1800 is in the state shown in FIG. 19 can show the detailed information items 1840. In other words, the tapping can allow for the navigation deeper into a particular layer than is shown in FIG. 19. Referring again to FIG. 20, as described above, the detailed information items 1840 can be shown as secondary digital content 1804 in an overlay above the primary video feed 1802. In addition, as also described above, these detailed information items 1840 can be displayed in a simulated Z-space. Further, the three additional layers ("FRIENDS," "MESSENGER," and "REQUESTS") are displayed in the rear when the "NEWSFEED" layer is the currently-displayed layer. The detailed information items 1840 can include whatever information may be relevant for the currently-displayed layer of the displayed application.

Figure 21:
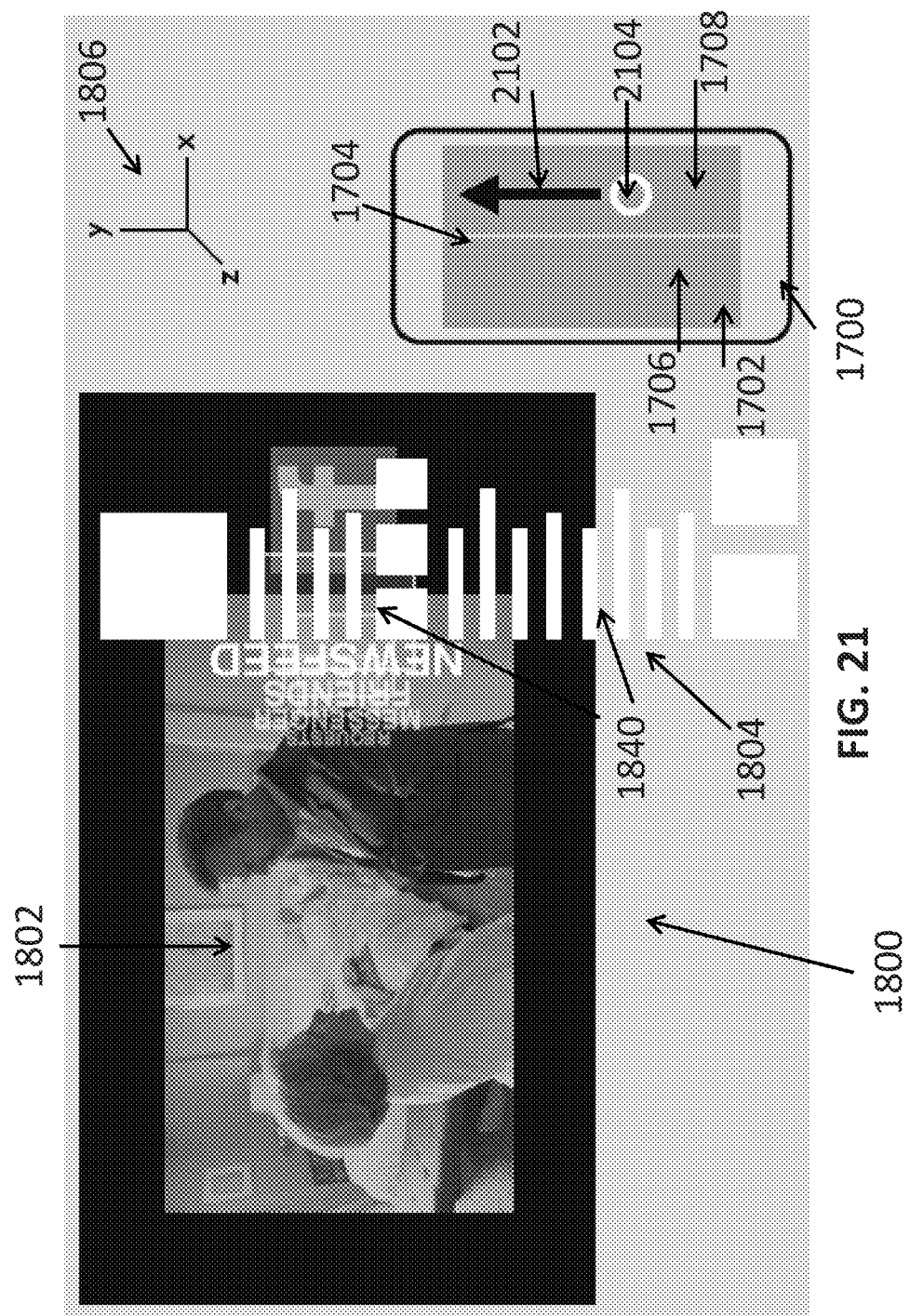
FIG. 21 illustrates an exemplary user interface for the controller of FIG. 17, as well as a display screen with secondary digital content and an illustration of a second type of user input gesture.
Figure 22:
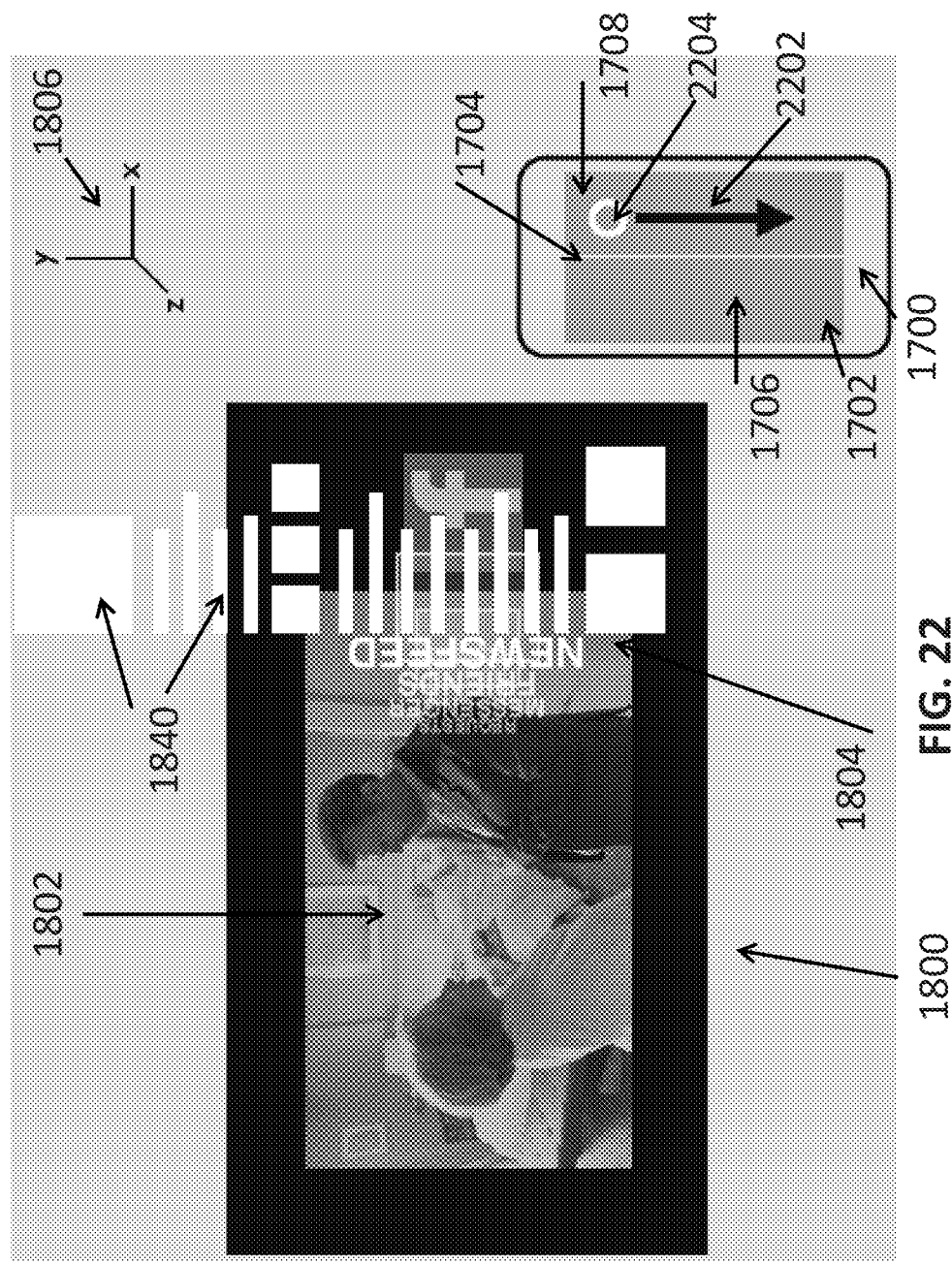
FIG. 22 illustrates an exemplary user interface for the controller of FIG. 17, as well as the state of the display screen with secondary digital content after the input gesture shown in FIG. 21.

FIG. 21 displays a second type of input gesture that can be used for scrolling through the currently-displayed layer in an X-Y plane on the display screen 1800. FIG. 21 displays gesture 2102 on the controller 1700 and the state of the secondary digital content 1804 before the gesture 2102, and FIG. 22 shows the state of the secondary digital content 1804 after the gesture 2102. The instructions detect this second input gesture by a user on the touch interface device of the controller 1700. In one embodiment, this second input gesture can be a gesture 2102 on the right side 1708 of the touch interface device, as shown in FIG. 21. For example, gesture 2102 is a gesture upward by the user from an initial point 2104. In this embodiment, in response to detecting the second input gesture 2102, the instructions cause scrolling through a currently-displayed layer of the selected application displayed on the display screen 1800, where scrolling through the currently-displayed layer takes place in an X-Y plane on the display screen 1800. For example, in FIG. 21, the gesture 2102, which is an upward gesture, causes scrolling through the currently-displayed layer, and in particular the information items 1840, in a vertical direction. More particularly, the upward gesture 2102 can cause the information items to move upward. Accordingly, FIG. 22 (after gesture 2102) shows the information items 1840 of the secondary digital content 1804 on the display screen 1800 moved to a second position that is upward from the position of these items 1840 in the depiction of FIG. 21. In this way, the user can scroll through secondary digital content in a currently-displayed layer of the application in the X-Y plane of the screen (an upward scrolling in the depicted embodiment, but in other embodiments could involve scrolling in other directions).

Figure 23:
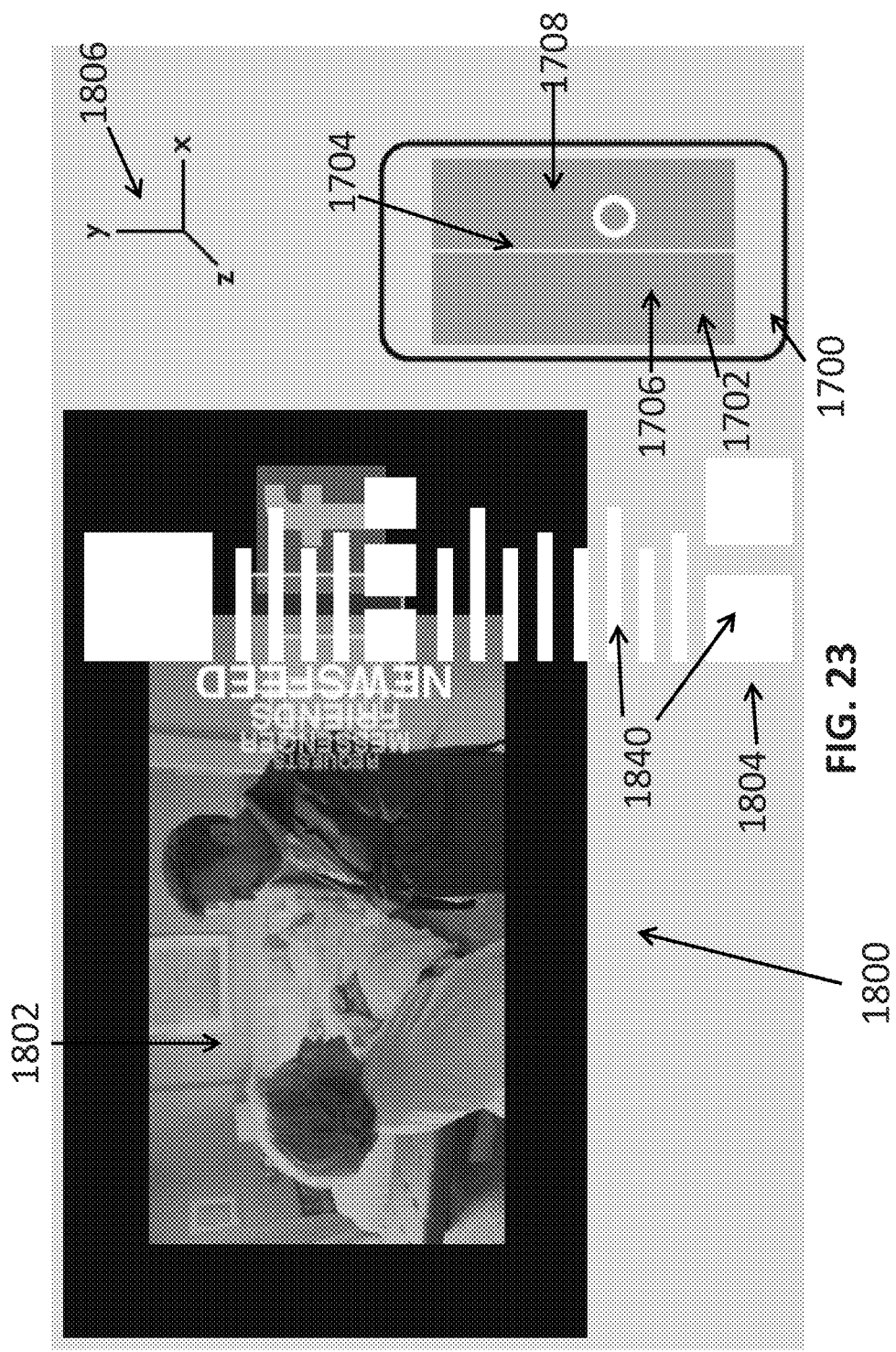
FIG. 23 illustrates an exemplary user interface for the controller of FIG. 17, as well as the state of the display screen with secondary digital content after the input gesture shown in FIG. 22.

FIGS. 22-23 depict how another type of gesture (similar to the second input gesture described immediately above) can cause scrolling through the secondary digital content in the opposite direction from that shown in FIGS. 21-22. For example, in FIG. 22, the depicted gesture 2202 is on the right side 1708 of the touch interface device, and the gesture 2202 is a gesture downward by the user from an initial point 2204. The instructions detect this input gesture by a user on the touch interface device of the controller 1700. In response to this detected input gesture, the secondary digital content 1804, and in particular items 1840, are moved downward. For example, FIG. 22 shows information items 1840 in one position, and FIG. 23 shows the position of these information items 1840 after the gesture 2202 depicted in FIG. 22. Thus, using input gestures 2102 and 2202, the user can scroll through a currently-selected layer of the application in an X-Y plane (in the depicted embodiment, up or down in the Y direction).

Figure 24:
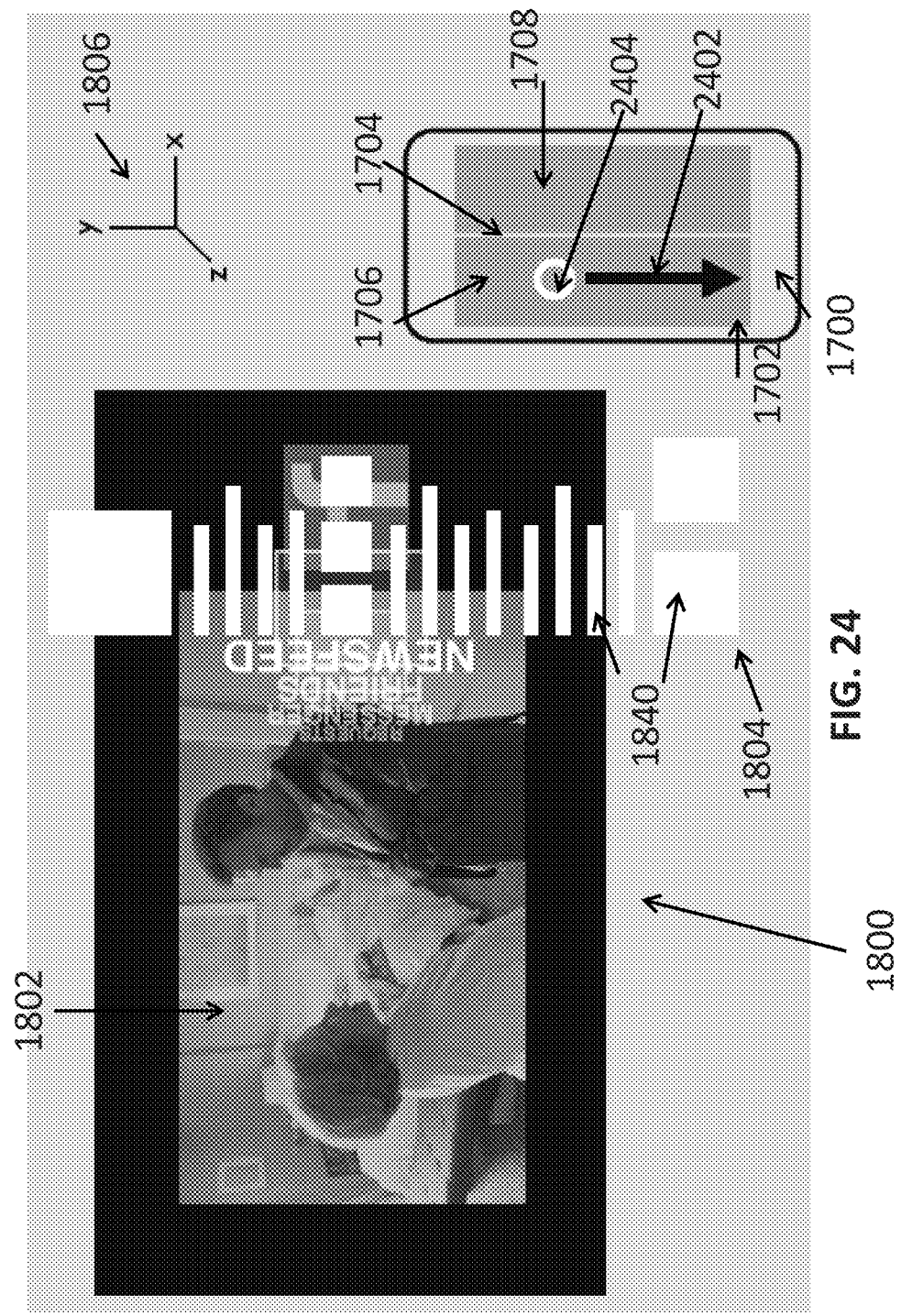
FIG. 24 illustrates an exemplary user interface for the controller of FIG. 17, as well as a display screen with secondary digital content and an illustration of a third type of user input gesture.
Figure 25:
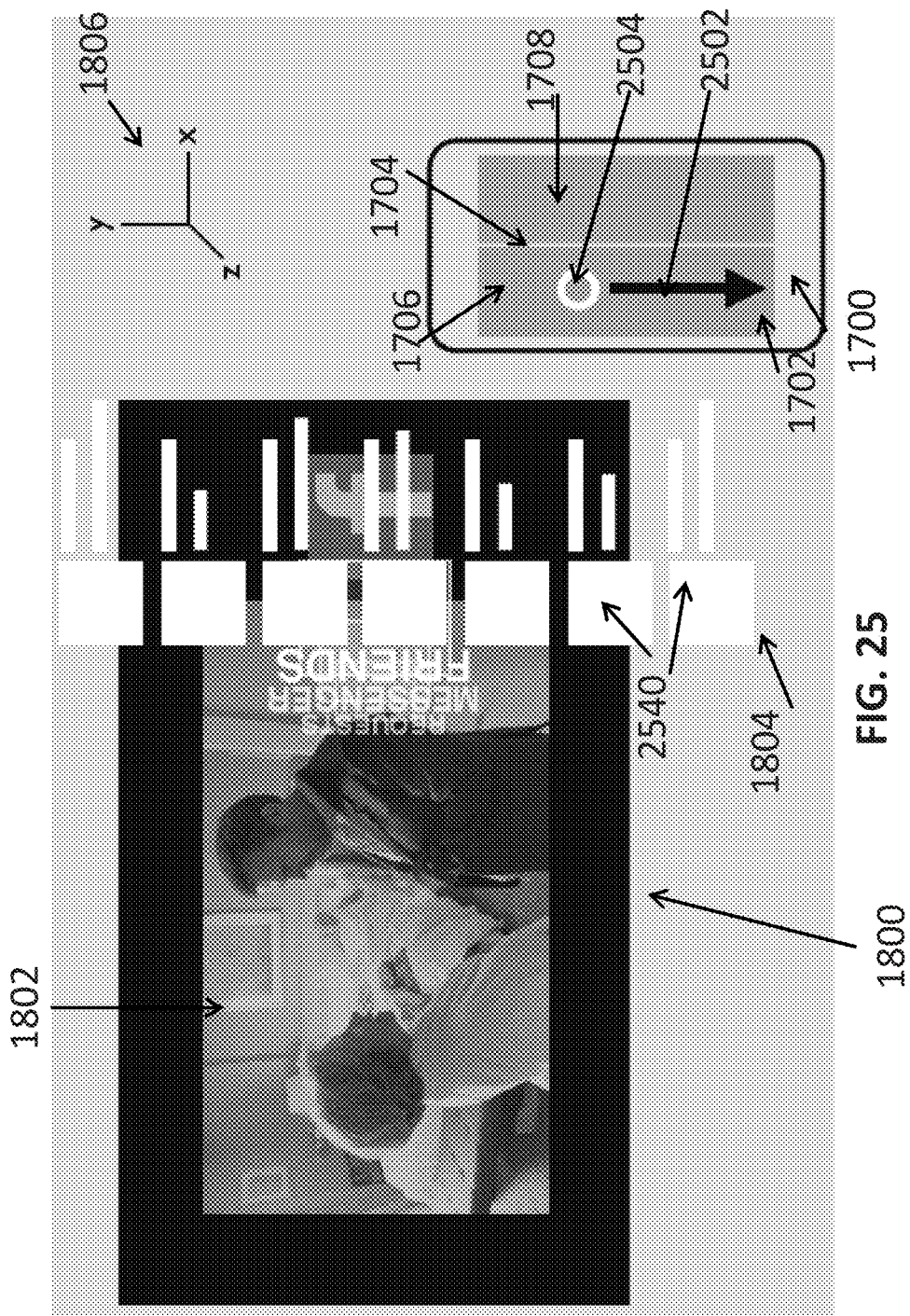
FIG. 25 illustrates an exemplary user interface for the controller of FIG. 17, as well as the state of the display screen with secondary digital content after the input gesture shown in FIG. 24.
Figure 26:
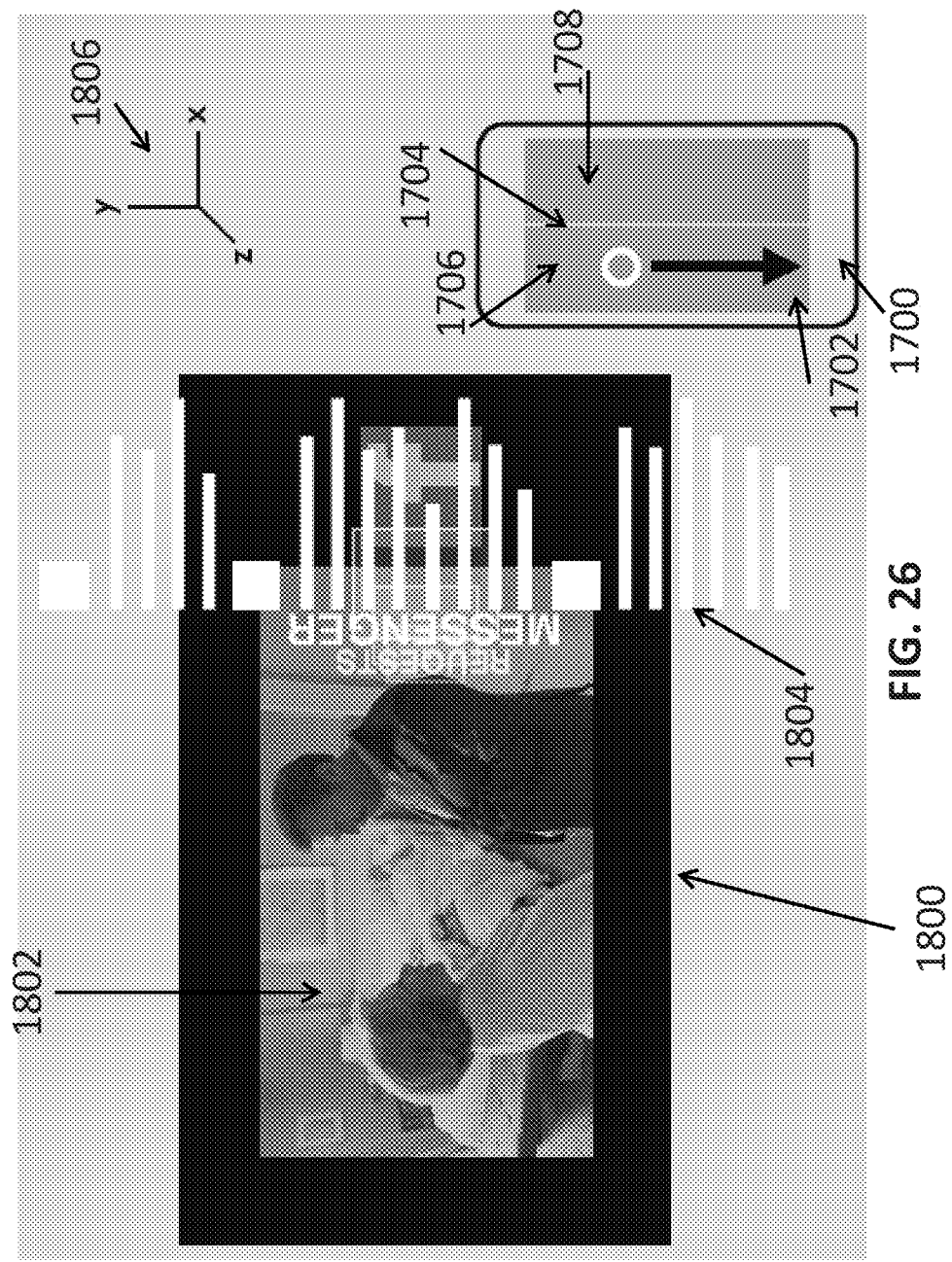
FIG. 26 illustrates an exemplary user interface for the controller of FIG. 17, as well as the state of the display screen with secondary digital content after the input gesture shown in FIG. 25.

FIGS. 24-26 depict a third type of input gesture that can be used for scrolling between layers of the selected application in a simulated Z-space on the display device 1800. FIG. 24 displays gesture 2402 on the controller 1700 and the state of the secondary digital content 1804 before the gesture 2402, and FIG. 25 shows the state of the secondary digital content 1804 after the gesture 2402. Further, FIG. 25 shows yet another gesture 2502 and the state of the secondary digital content 1804 before the gesture 2502, and FIG. 26 shows the state of the secondary digital content 1804 after the gesture 2502. In these embodiments, the instructions detect this third input gesture by a user on the touch interface device of the controller 1700. In one embodiment, this third input gesture can be a gesture 2402 on the left side 1706 of the touch interface device, as shown in FIG. 24 (FIG. 25 also shows a gesture 2502 on the left side 1706 of the user interface 1702). For example, in FIG. 24, gesture 2402 is a gesture downward by the user from an initial point 2404. In this embodiment, in response to detecting the third input gesture 2402, the instructions cause scrolling between layers of the selected application in a simulated Z-space on the display device 1800. For example, in FIG. 24, the gesture 2402, which is a downward gesture on the left side 1706 of the user interface 1702, causes scrolling through the layers of the application, and in particular the scrolling through from the "NEWSFEED" layer in FIG. 24 to the "FRIENDS" layer in FIG. 25. More particularly, the downward gesture 2402 can cause the movement in Z-space between layers of the secondary digital content displayed on the display device 1800. Accordingly, FIG. 24 shows the information items 1840 of the "NEWSFEED" layer of the application, and after gesture 2402 causes a change in the displayed layer of the application, FIG. 25 shows the information items 2540 of the "FRIENDS" layer of the application. In this way, the user can scroll through layers of the displayed application in Z-space by using the third type of gesture.

FIG. 25 depicts another gesture 2502 that is a third type of gesture similar to that described in connection with FIG. 24. Once again, gesture 2502 is a downward gesture from an initial point 2504, and gesture 2502 causes movement between the layers of the displayed application. In FIG. 25, for example, before the gesture 2502, the "FRIENDS" layer is in the front. After the gesture 2502, FIG. 26 shows that the "MESSENGER" layer of the application is in the front.

In one embodiment, a downward gesture on the left side 1706 (as in FIG. 24-26) pulls the layered dimensions in the stack of layers toward the user in the simulated Z-space. In addition, an upward gesture on the left side 1706 can push the layered dimensions in the stack of layers away the user in the simulated Z-space (i.e., move the layers in the opposite direction as depicted in FIGS. 24-26).

A variety of additional gestures can also be used within the scope of the invention. For example, once an application is displayed (as in, for example, FIG. 26), a gesture from the right side 1708 to the left side 1706 can cause the displayed application to close and can cause the list of applications (or icons) to appear again (as shown, for example, in FIG. 18). In addition, when the applications (or icons) appear as shown in FIG. 18, a gesture from the right side 1708 to the left side 1706 can cause the secondary digital content to exit so that only the primary video stream 1802 is still shown on the display screen 1800. Additional gestures can be used in addition to those described above to control various features of the secondary digital content.

Figure 27:
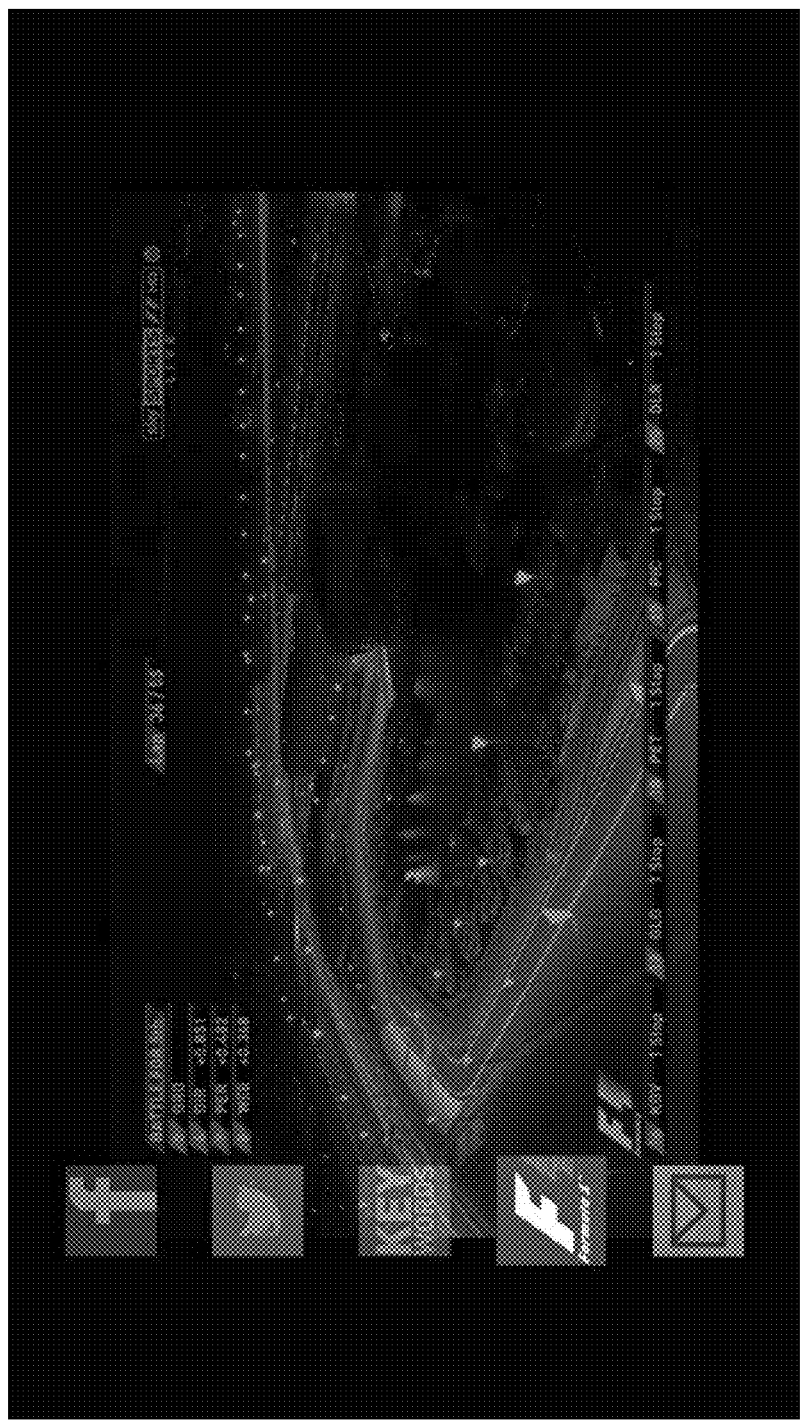
FIG. 27 is a first exemplary view of a display screen with secondary digital content that can be controlled through the use of the controller of FIG. 17.
Figure 28:
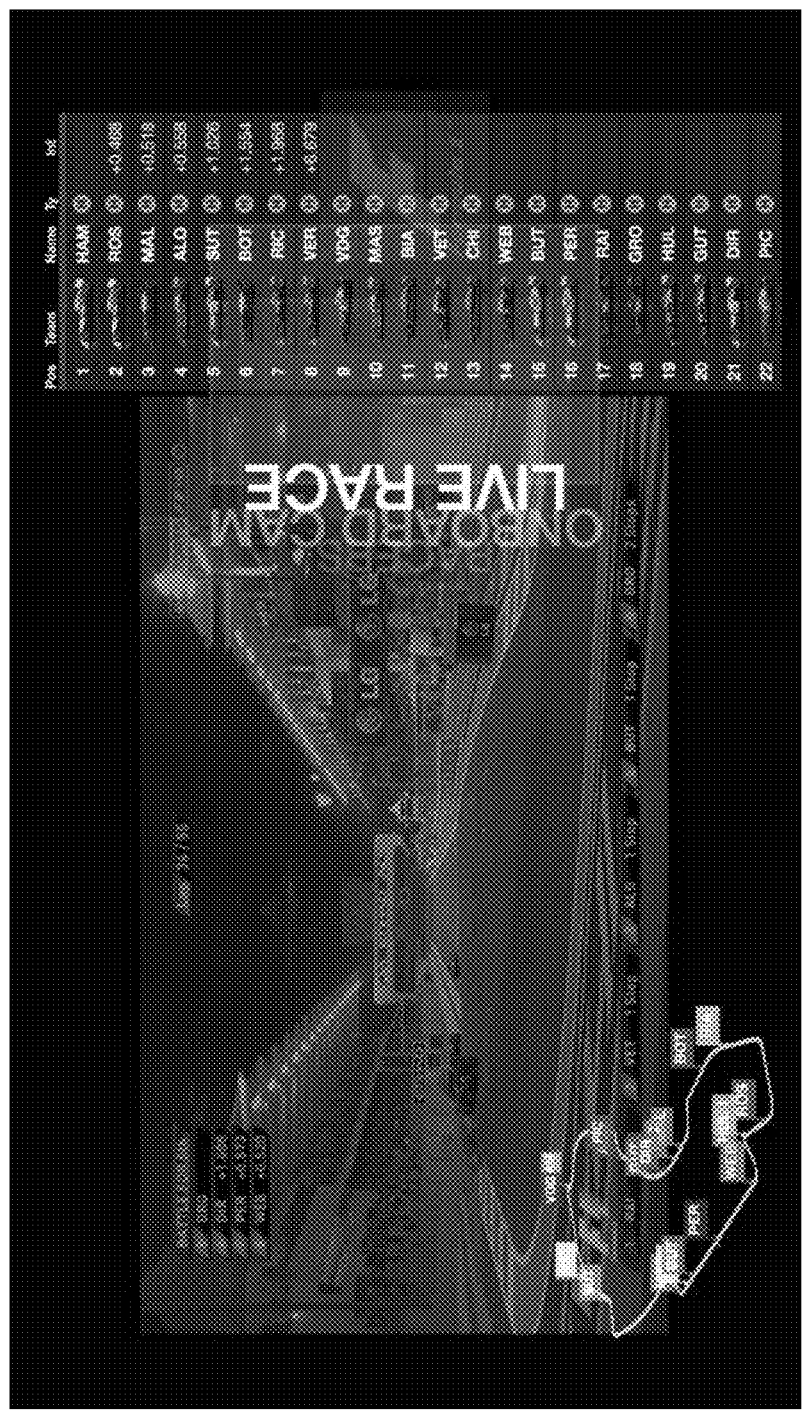
FIG. 28 is a second exemplary view of a display screen with secondary digital content that can be controlled through the use of the controller of FIG. 17 and displayed with a gesture from the screen of FIG. 27.
Figure 29:
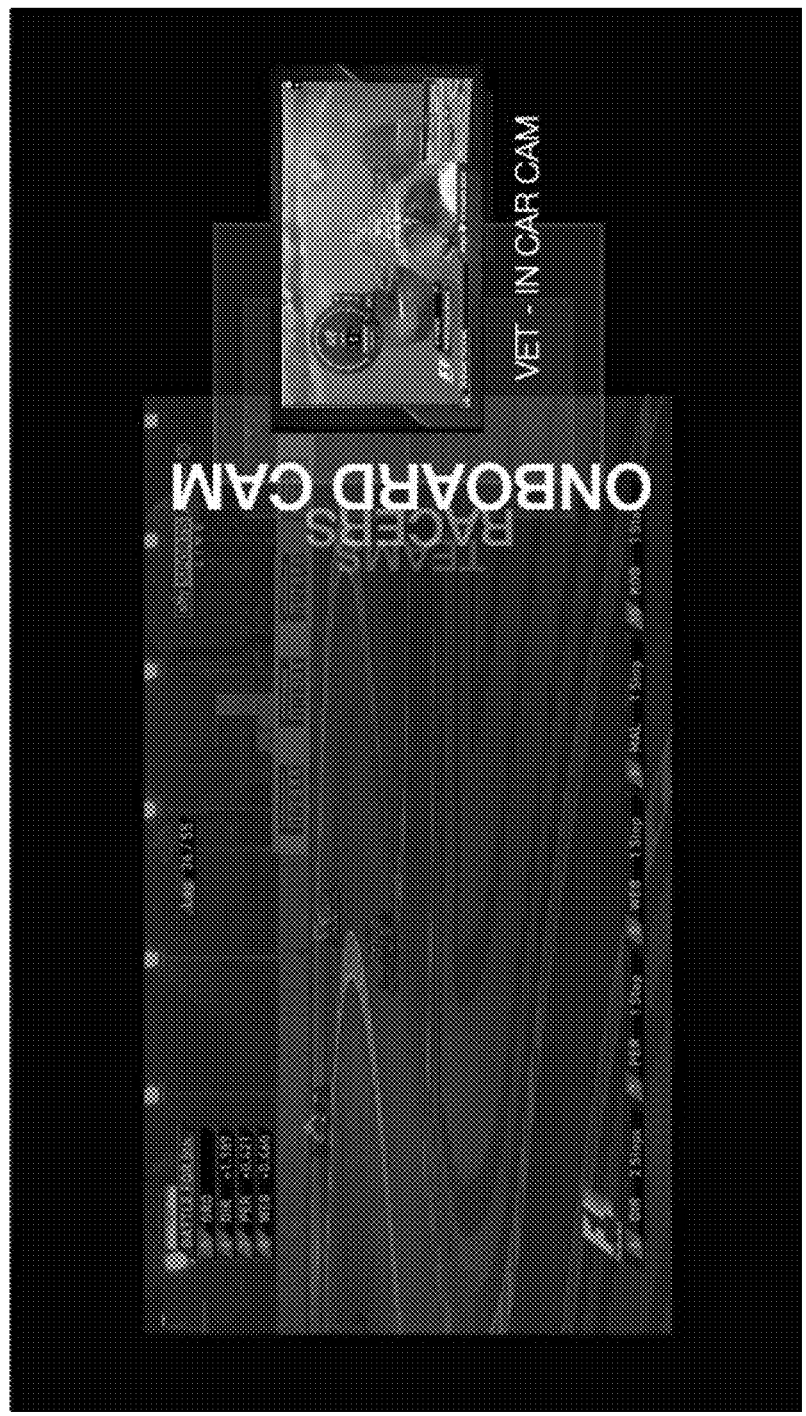
FIG. 29 is a third exemplary view of a display screen with secondary digital content that can be controlled through the use of the controller of FIG. 17 and displayed with a gesture from the screen of FIG. 28.
Figure 30:
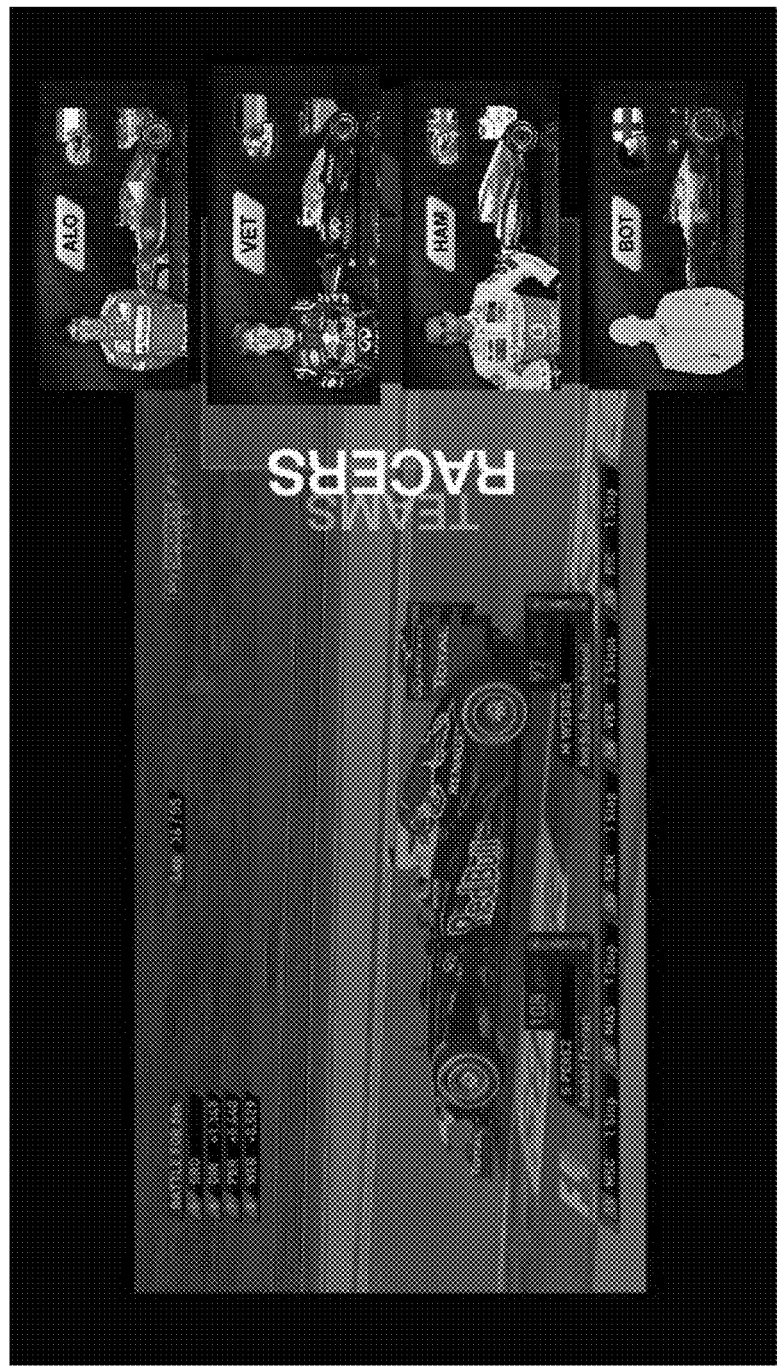
FIG. 30 is a fourth exemplary view of a display screen with secondary digital content that can be controlled through the use of the controller of FIG. 17 and displayed with a gesture from the screen of FIG. 29.

FIGS. 27-30 show additional examples of secondary digital content that can be displayed in an overlay on top of a primary video stream and that may be controlled through the controller 1700 in the manner described above. For example, FIG. 27 depicts icons on the left side of the display screen. These icons include icons for Facebook™, Twitter™, Key Words™, Formula 1™, and mail. In FIG. 27, the Formula 1™ icon is larger than the others, meaning that it is the currently selected icon (or application). An input gesture (such as gesture 1820) can cause the opening of the application for Formula 1™. Accordingly, FIG. 28 shows the Formula 1™ application in the opened position. Further, FIG. 28 shows the "LIVE RACE" layer of the Formula 1™ application, which includes a listing of the position and names of the racers, as well as the interval between the racers. FIG. 28 shows another layer of the Formula 1™ application, and in particular a layer for "ONBOARD CAM," which can show a view from onboard cameras for certain racers. From the "LIVE RACE" layer of FIG. 28, a gesture such as gesture 2402 of FIG. 24 will result in the display of the "ONBOARD CAM" layer of FIG. 29. Further, from the "ONBOARD CAM" layer of FIG. 29, another gesture such as gesture 2402 of FIG. 24 will result in the display of the "RACERS" layer of FIG. 30. In addition, a gesture such as gesture 2102 of FIG. 21 can result in scrolling through the racers within the layer shown in FIG. 30 so that information regarding different racers can be explained.

As described above, a plurality of types of gestures on a controller 1700 can be used to control secondary digital content displayed on a display screen. For example, an initial gesture (such as a double tap) on the touch interface device can be used to open the secondary digital content on the display screen 1800, as shown in FIG. 18. A first type of gesture (such as gesture 1802 in FIG. 18) can then be used to select a particular application for display as secondary digital content on the display screen 1800. A second type of gesture (such as gesture 2102 or 2202 in FIGS. 21-22) can then be used to scroll through displayed information of the application in a particular layer in the X-Y plane. This second type of gesture maintains the same layer of the application for display, but allows scrolling within that layer. Further, a third type of gesture (such as gesture 2402 or 2502 in FIGS. 24-25) can be used to move between different layers in a simulated Z-space on the display screen 1800. In addition, the left side 1706 of the user interface 1702 can be used to move in and out of the screen in a simulated Z-space. The right side 1708 is for scrolling in the X-Y plane of the display screen. Further, the controller described herein allows the user to look at the display screen, rather than the controller itself (for example, to find custom buttons or keys for a traditional control device), in order to interact with secondary digital content and move that content on the display screen. In addition, the controller described herein can be used without the use of a mouse or cursor in the display screen. Instead, the user can easily use the controller without a cursor or mouse on the display screen. In addition, the general feeling of the viewer is that they are virtually moving the interface graphical elements that are projected in the space in front of them between the display screen and the viewer. These gestures by the viewer can be combined with other actions, such as taps, double taps, or swipes.

The embodiments described above allow the use of the Z-space to layer information in an interaction space that can be considered to be in front of the display screen 1800. For example, the primary video stream 1802 can appear on the display screen 1800, and additional secondary digital content can be displayed in an interaction space between the viewer and the display screen 1800. The primary video stream 1802, for instance, can be television programs or videos, as well as advertisements. The secondary digital content displayed in the interaction space can be whatever information the user may desire, such as applications that provide content that relates to the primary video stream. This interaction space, or simulated Z-space, can provide for the display of layers of secondary digital content, and the controller can be used to control this secondary digital content. The interaction space can be displayed as a 3D TV screen "pushed out" from the display screen, through simulated 3D that appears as translucent layers on the display screen, or through augmented reality glasses. This allows taking secondary digital content related to television or video information that users typically view through second screen mobile devices and displaying it in the interaction space between the viewer and the display screen.

The interaction with the interaction space can take place through a variety of ways, including through the use of a touchpad or touchscreen controller as described above, or through the use of a smartwatch. In addition, instead of the controller 1700 described above, the user can interact with the secondary digital content through hand gestures, such as through the use of the Kinect™ or Leap Motion™ to interpret hand gestures. For example, a hand gesture swipe to the right or a hand gesture swipe to the left, or up or down, can be interpreted in a similar manner as set forth above in connection with FIGS. 17-30.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways. Also, it is to be understood that the phraseology and terminology employed herein are for the purpose of description and should not be regarded as limiting.

What is claimed is:

1. A controller for controlling a display device that displays secondary digital content displayed in an overlay above a primary video stream, the controller including a touch interface device, a processor, and a memory storing non-transitory instructions for controlling the processor to perform operations during execution, wherein the operations comprise:

displaying a user interface for control of the secondary digital content in the overlay above the primary video stream on the display device, wherein the user interface includes only a line from top to bottom separating the user interface into a left side and a right side, wherein the user interface includes no custom buttons or keys;

detecting a first input gesture by a user on the touch screen display from the left side to the right side;

in response to detecting the first input gesture, selecting an application for display on a display screen from a set of two or more applications displayed on the display screen, wherein the two or more applications are secondary digital content displayed in the overlay above the primary video stream on the display screen;

detecting a second input gesture by the user on the right side of the user interface on the touch interface device;

in response to detecting the second input gesture, scrolling through a currently-displayed layer of the selected application displayed on the display screen, wherein scrolling through the currently-displayed layer takes place in an X-Y plane on the display screen;

detecting a third input gesture by the user on the left side of the user interface on the touch interface device; and in response to detecting the third input gesture, scrolling between layers of the selected application in a simulated Z-space on the display device.

2. The controller of claim 1, wherein the touch interface device is a touch screen display.

3. The controller of claim 2, wherein the touch screen display is on a smartphone.

4. The controller of claim 3, wherein the instructions, when executed by the processor, further cause:

detecting an initial input gesture by the user on the touch screen display; and in response to detecting the initial input gesture, displaying the set of two or more applications displayed on the display screen.

5. The controller of claim 1, wherein the touch interface device is a touchpad.

6. A non-transitory computer readable storage medium having stored therein instructions, which when executed by a processor cause:

displaying a user interface for control of secondary digital content in an overlay above a primary video stream on a display device, wherein the user interface includes only a line from top to bottom separating the user interface into a left side and a right side, wherein the user interface includes no custom buttons or keys;

detecting a first input gesture by a user on the touch screen display from the left side to the right side;

in response to detecting the first input gesture, selecting an application for display on a display screen from a set of two or more applications displayed on the display screen, wherein the two or more applications are secondary digital content displayed in the overlay above the primary video stream on the display screen;

detecting a second input gesture by the user on the right side of the user interface on the touch interface device;

in response to detecting the second input gesture, scrolling through a currently-displayed layer of the selected application displayed on the display screen, wherein scrolling takes place in an X-Y plane on the display screen;

detecting a third input gesture by the user on the left side of the user interface on the touch interface device; and in response to detecting the third input gesture, scrolling between layers of the selected application in a simulated Z-space on the display device.

7. The computer readable storage medium of claim 6, wherein the touch interface device is a touch screen display.

8. The computer readable storage medium of claim 7, wherein the touch screen display is on a smartphone.

9. The computer readable storage medium of claim 6, wherein the instructions, when executed by the processor, further cause:

detecting an initial input gesture by the user on the touch interface device; and in response to detecting the initial input gesture, displaying the set of two or more applications displayed on the display screen.

10. A controller for controlling a display device, comprising:

(a) a touch screen display;

(b) a processor; and (c) a computer readable medium storing instructions for controlling the processor to perform operations during execution performed by the processor, wherein the operations comprise:

displaying a user interface for control of secondary digital content in an overlay above a primary video stream on a display device, wherein the user interface includes only a line from top to bottom separating the user interface into a left side and a right side, wherein the user interface includes no custom buttons or keys;

detecting a first input gesture by a user on the touch screen display from the left side to the right side;

in response to detecting the first input gesture, selecting an application for display on a display screen from a set of two or more applications displayed on the display screen, wherein the two or more applications are secondary digital content displayed in the overlay above the primary video stream on the display screen;

detecting a second input gesture by the user on the right side of the user interface on the touch interface device;

in response to detecting the second input gesture, scrolling through a currently-displayed layer of the selected application displayed on the display screen, wherein scrolling through the currently-displayed layer takes place in an X-Y plane on the display screen;

detecting a third input gesture by the user on the left side of the user interface on the touch interface device; and in response to detecting the third input gesture, scrolling between layers of the selected application in a simulated Z-space on the display device.

11. The controller of claim 10, wherein the second input gesture is a gesture in the vertical direction.

12. The controller of claim 10, wherein the third input gesture is a gesture in the vertical direction.

* * * * *